(12) United States Patent
Suganuma et al.

(10) Patent No.: US 7,417,090 B2
(45) Date of Patent: Aug. 26, 2008

(54) WATER-DISPERSIBLE POLYISOCYANATE COMPOSITION, PRODUCTION THEREOF, AND WATER-BASED CURABLE COMPOSITION AND APPLICATION THEREOF

(75) Inventors: Hajime Suganuma, Osaka (JP); Masaki Watanabe, Osaka (JP); Masataka Ooka, Ikoma (JP)

(73) Assignee: Dainippon Ink & Chemicals, Inc., Tokyo (JP)

( * ) Notice: Subject to any disclaimer, the term of this patent is extended or adjusted under 35 U.S.C. 154(b) by 84 days.

(21) Appl. No.: 11/590,814

(22) Filed: Nov. 1, 2006

(65) Prior Publication Data

US 2007/0049691 A1    Mar. 1, 2007

Related U.S. Application Data

(62) Division of application No. 10/149,412, filed on Jun. 20, 2002, now Pat. No. 7,166,673.

(51) Int. Cl.
*C08L 75/04* (2006.01)
(52) U.S. Cl. ............... 525/123; 528/85; 106/287.25
(58) Field of Classification Search .......... 525/123; 528/85; 106/287.25
See application file for complete search history.

(56) References Cited

U.S. PATENT DOCUMENTS 4,431,754 A * 2/1984 Hoffman .............. 521/137
4,442,236 A   4/1984 Rasshofer et al.
5,252,696 A   10/1993 Laas et al.

FOREIGN PATENT DOCUMENTS

| DE | 3231399 A1 | 8/1982 |
|----|-----------|--------|
| EP | 0 102 007 A2 | 3/1984 |
| JP | 55-7472 | 2/1980 |
| JP | 59-58021 | 4/1984 |
| JP | 1-168716 | 7/1989 |
| JP | 6-239957 | 8/1994 |
| JP | 7-113005 | 5/1995 |
| JP | 9-71720 | 3/1997 |
| JP | 9-104814 | 4/1997 |
| JP | 2000-191743 | 7/2000 |

OTHER PUBLICATIONS

Rompp-Chemie Lexikon, pp. 3482, 3514, 4859.
Office Action issued on Jul. 5, 2007 on the counterpart European Patent Application No. 01978831.4.

* cited by examiner

*Primary Examiner*—Kuo-Liang Peng
(74) *Attorney, Agent, or Firm*—Edwards Angell Palmer & Dodge LLP

(57) ABSTRACT

A water-dispersible polyisocyanate composition comprises a hydrophobic polyisocyanate (A) and a vinyl polymer (B) having a nonionic group and an isocyanate group, in which the hydrophobic polyisocyanate (A) can be dispersed in a water-based medium by the vinyl polymer (B) having a non-ionic group and an isocyanate group. The water-dispersible polyisocyanate composition is produced by reacting a hydrophobic polyisocyanate with a vinyl polymer (b) having a nonionic group and an active hydrogen group-containing group capable of reacting with an isocyanate group at a molar ratio of the isocyanate group to the active hydrogen group-containing group of 3 to 350.

13 Claims, No Drawings

WATER-DISPERSIBLE POLYISOCYANATE COMPOSITION, PRODUCTION THEREOF, AND WATER-BASED CURABLE COMPOSITION AND APPLICATION THEREOF

CROSS REFERENCE TO RELATED APPLICATION

This application is a divisional application of U.S. application Ser. No. 10/149,412, filed Jun. 20, 2002 now U.S. Pat. No. 7,166,673, which is hereby incorporated by reference herein in its entirety.

TECHNIAL FIELD

The present invention relates to a water-dispersible polyisocyanate composition, which is useful in industrial fields, such as coatings, adhesives, and fiber processing agents, and it also relates to a water-based curable composition containing the polyisocyanate composition and to an application thereof. More particularly, the present invention relates to a water-dispersible polyisocyanate composition containing a polyisocyanate and a specific vinyl polymer and a water-based curable composition, which are useful for various purposes such as for water-based coatings, adhesives, binders, and impregnants, and it also relates to a water-based coating, and a water-based adhesive.

BACKGROUND ART

Recently, because of environmental problems, it has been strongly desired to reduce the amount of volatile organic solvents used. To meet this demand, trials have been performed in which organic solvent-based compositions containing a polyisocyanate were replaced by water-based compositions. For example, Japanese Examined Patent Application, Second Publication No. Sho 55-7472 and U.S. Pat. No. 5,252,696 (corresponding to Japanese Unexamined Patent Application, First Publication No. Hei 5-222150) describe polyisocyanate compositions wherein a portion of the polyisocyanate is modified with a polyoxyalkylene glycol whose one terminal is blocked with an alkoxy group. When these compositions are dispersed in water, there arises a problem that the reaction between isocyanate groups in the polyisocyanate and water is liable to occur and isocyanate groups are rapidly consumed by this reaction. A curable composition comprising such a polyisocyanate composition and a water-based resin having an active hydrogen group-containing group has a short pot life and also has drawbacks that a cured material obtained form such a curable composition is inferior in hardness and water resistance.

Japanese Unexamined Patent Application, First Publication No. Hei 7-113005 describes a polyisocyanate composition having an improved water dispersibility, which is obtained by modifying a portion of isocyanate groups in the polyisocyanate with a polyoxyalkylene glycol whose one terminal is blocked with an alkoxy group, and an aliphatic compound having a hydroxyl group or a fatty acid ester. A dispersion obtained by dispersing this polyisocyanate composition in water has a slightly improved stability of isocyanate groups to water, but has insufficient dispersibility in water and poor workability. Also a curable composition comprising the polyisocyanate composition and a water-based resin having an active hydrogen group-containing group has a short pot life and the resulting cured material is also inferior in hardness and water resistance.

Japanese Unexamined Patent Application, First Publication No. Hei 9-71720 describes a polyisocyanate composition obtained by adding an ionic emulsifier to a polyisocyanate obtained by modifying a portion of isocyanate groups with a polyoxyalkylene glycol whose one terminal is blocked with an alkoxy group. In such a composition, the water dispersibility and stability of isocyanate groups to water are slightly improved but are not satisfactory. Since a composition comprising the polyisocyanate composition and a water-based resin having an active hydrogen group-containing group contains an ionic emulsifier, the resulting cured material is inferior in hardness and water resistance.

Japanese Unexamined Patent Application, First Publication No. Hei 1-168716 discloses a method of dispersing a polyisocyanate using a dispersant having no isocyanate group obtained by reacting a polyisocyanate with a polyoxyalkylene glycol whose one terminal is blocked with an alkoxy group, a higher alcohol having 8 or more carbon atoms, a fatty acid ester having an active hydrogen group-containing group wherein fatty acid has 8 or more carbon atoms, and a polyoxypropylene monoalkyl ether.

Japanese Unexamined Patent Application, First Publication No. Hei 9-104814 discloses a polyisocyanate composition comprising a polyisocyanate and a dispersant having no isocyanate group, which is obtained by reacting a polyisocyanate with a polyoxyalkylene glycol whose one terminal is blocked with an alkoxy group and an aliphatic compound having an active hydrogen group-containing group such as a higher alcohol. When the composition obtained by the method disclosed in Japanese Unexamined Patent Application, First Publication No. Hei 1-168716 or the composition disclosed in Japanese Unexamined Patent Application, First Publication No. Hei 9-104814 is dispersed in water, the stability of isocyanate groups to water is comparatively good. However, since the composition comprising the polyisocyanate composition and the water-based resin having an active hydrogen group-containing group has poor compatibility because it contains a dispersant having no isocyanate group, there are drawbacks that the resulting cured material is inferior in appearance, hardness and water resistance.

Japanese Unexamined Patent Application, First Publication No. Hei 6-239957 describes a polyisocyanate composition comprising a polyisocyanate, a portion of which is modified with a polyoxyethylene glycol whose one terminal is blocked with an alkoxy group, and an acrylic polymer having an isocyanate group. Such a composition has problems that the stability of isocyanate groups to water is insufficient and a curable composition made of a water-based resin and the polyisocyanate composition has a short pot life and the resulting cured material is inferior in water resistance.

Japanese Unexamined Patent Application, First Publication No. 2000-191743 discloses a polyisocyanate composition obtained by modifying with an ionic surfactant containing an active hydrogen and a nonionic surfactant containing an active hydrogen. Such a composition has sufficient water dispersibility, but is insufficient in stability of isocyanate groups to water. Also, a curable composition comprising such a composition and a water-based resin having an active hydrogen group-containing group has a short pot life and has a drawback that the cured material is inferior in hardness and water resistance.

DISCLOSURE OF THE INVENTION

An object of the present invention is to solve various problems in the conventional arts described above and to provide a water-dispersible polyisocyanate composition, which has superior dispersibility in water, stability to water, and compatibility with a water-based resin having an active hydrogen group-containing group, to provide a water-based curable composition comprising the polyisocyanate composition and water, which has superior stability to water and curability, to provide a water-based curable composition comprising the polyisocyanate composition and a water-based resin having an active hydrogen group-containing group, which has a long pot life and excellent curability and also yields cured materials having excellent appearance, water resistance and hardness, and to provide a water-based coating containing the above-described water-based curable composition, and a water-based adhesive.

The present inventors have intensively researched to achieve the object described above and found that a composition comprising a vinyl polymer having a nonionic group and an isocyanate group and a hydrophobic polyisocyanate has superior dispersibility in water and the isocyanate group has good stability to water in a water dispersion obtained by dispersing in water and also the water dispersion has a long pot life and excellent curability, and that a composition comprising the polyisocyanate composition and a water-based resin having an active hydrogen group-containing group has a long pot life and excellent curability and the composition can yield a cured material which is superior in appearance, hardness and water resistance. Thus, the present invention has been completed.

The present invention provides a water-dispersible polyisocyanate composition comprising a hydrophobic polyisocyanate (A) and a vinyl polymer (B) having a nonionic group and an isocyanate group, wherein the hydrophobic polyisocyanate (A) is dispersible in a water-based medium by the vinyl polymer (B) having a nonionic group and an isocyanate group.

The present invention also provides a process for producing a water-dispersible polyisocyanate composition, which comprises reacting a hydrophobic polyisocyanate with a vinyl polymer (b) having a nonionic group and an active hydrogen group-containing group capable of reacting with an isocyanate group at a molar ratio of the isocyanate group to the active hydrogen group-containing group of 3 to 350.

Furthermore, the present invention provides a water-based curable composition comprising the water-dispersible polyisocyanate composition and a water-based resin (C) or water. Moreover, the present invention provides a water-based coating comprising the water-based curable composition and a water-based adhesive comprising the water-based curable composition.

BEST MODE FOR CARRYING OUT THE INVENTION

The present invention will now be described in more detail.

First, a water-dispersible polyisocyanate composition of the present invention will be described.

The water-dispersible polyisocyanate composition of the present invention contains a hydrophobic polyisocyanate (A) and a vinyl polymer (B) having a nonionic group and an isocyanate group. In the water-dispersible polyisocyanate composition of the present invention, the vinyl polymer (B) having a nonionic group has an ability to disperse the hydrophobic polyisocyanate (A) in a water-based medium.

The hydrophobic polyisocyanate (A) used in the present invention refers to a polyisocyanate which does not have well-known hydrophilic groups such as anionic groups, cationic groups and nonionic groups in the molecule. Typical examples of the hydrophobic polyisocyanate (A) include aliphatic diisocyanates such as 1,4-tetramethylene diisocyanate, ethyl(2,6-diisocyanato)hexanoate, 1,6-hexamethylene diisocyanate, 1,12-dodecamethylene diisocyanate, or 2,2,4- or 2,4,4-trimethylhexamethylene diisocyanate; aliphatic triisocyanates such as 1,3,6-hexamethylene triisocyanate, 1,8-diisocyanato-4-isocyanatomethyloctane, or 2-isocyanatoethyl(2,6-diisocyanato)hexanoate; alicyclic diisocyanates such as 1,3- or 1,4-bis(isocyanatomethylcyclohexane), 1,3- or 1,4-diisocyanatocyclohexane, 3,5,5-trimethyl(3-isocyanatomethyl)cyclohexyl isocyanate, dicyclohexylmethane-4,4'-diisocyanate, or 2,5- or 2,6-diisocyanatomethylnorbornane; alicyclic triisocyanates such as 2,5- or 2,6-diisocyanatomethyl-2-isocyanato propylnorbornane; aralkylene diisocyanates such as m-xylylene diisocyanate or α,α,α',α'-tetramethyl-m-xylylene diisocyanate; aromatic diisocyanates such as m- or p-phenylene diisocyanate, tolylene-2,4- or 2,6-diisocyanate, diphenylmethane-4,4'-diisocyanate, naphthalene-1,5-diisocyanate, diphenyl-4,4'-diisocyanate, 4,4'-diisocyanato-3,3'-dimethyldiphenyl, 3-methyl-diphenylmethane-4,4'-diisocyanate, or diphenyl ether-4,4'-diisocyanate; aromatic triisocyanates such as triphenylmethane triisocyanate or tris(isocyanatophenyl)thiophosphate; diisocyanates or polyisocyanates having an urethodione structure obtained by cyclodomerization of isocyanate groups of various diisocyanates and triisocyanates described above; polyisocyanates having an isocyanurate structure obtained by cyclodimerization of isocyanate groups of various diisocyanates and triisocyanates described above; polyisocyanates having a biuret structure obtained by reacting various diisocyanates or triisocyanates described above with water; polyisocyanates having an oxadiazinetrione structure obtained by reacting various diisocyanates or triisocyanates with carbon dioxide; and polyisocyanate having an allophanate structure.

Among these hydrophobic polyisocyanates, an aliphatic or alicyclic diisocyanate, or triisocyanate, aralkylene diisocyanate or a polyisocyanate derived therefrom is preferred in view of the stability of isocyanate groups in water, and the weather resistance of a coating film when a curable composition containing a water-dispersible polyisocyanate composition is used as a coating. Among these polyisocyanates, polyisocyanates having three or more functionalities such as isocyanurate type polyisocyanate, polyisocyanate having a biuret structure, polyisocyanate having an urethodione structure, polyisocyanate having an allophanate structure, or polyisocyanate obtained by reacting diisocyanate with polyhydric alcohol having three or more functionalities is preferred in order to obtain a water-based curable composition having excellent weather resistance and durability.

In addition to the hydrophobic polyisocyanate (A), a polyisocyanate having a hydrophilic group can be used as far as the stability to water of the water-dispersible polyisocyanate composition of the present invention is not impaired.

Typical examples of the vinyl polymer (B) having a nonionic group and an isocyanate group [hereinafter referred to as an NCO group-containing vinyl polymer (B)] used in the present invention include an acrylic polymer, a fluoro olefin polymer, a vinyl ester polymer, an aromatic vinyl polymer, and a polyolefin polymer. Among these polymers, an acrylic polymer and a fluoro olefin polymer are preferred in view of the compatibility when the water-dispersible polyisocyanate composition of the present invention is used as a curing agent and an acrylic polymer is used as a base resin.

Well-known nonionic groups are introduced into the NCO group-containing vinyl polymer (B). Preferred examples thereof are polyoxyalkylene groups whose terminal is blocked with various groups such as an alkoxy group, a substituted alkoxy group, an ester group, and a carbamate group. Typical examples thereof include polyoxyalkylene groups wherein the oxyalkylene part is copolymerized at random, such as a poly(oxyethylene-oxypropylene) group, those wherein different polyoxyalkylene groups are bonded in the block form, such as a polyoxyethylene-polyoxypropylene group, a polyoxyalkylene group obtained by the ring-opening polymerization of a dioxolane ring, in addition to various polyoxyalkylene groups such as a polyoxyethylene group, a polyoxypropylene group, and a polyoxybutylene group. Among these polyoxyalkylene groups, those having an oxyethylene unit as an essential constituent unit are preferred.

Among the above-described groups used to block the terminal, an alkoxy group or substituted alkoxy group is preferred and an alkoxy group is particularly preferred. Typical examples of the alkoxy group include lower alkoxy group such as methoxy group, ethoxy group, or butoxy group.

The number-average molecular weight of the polyoxyalkylene group is within a range from about 130 to 10,000, preferably from 150 to 6,000, and most preferably from 200 to 2,000, in view of the dispersibility of the polyisocyanate composition in water and the curability of the water-based curable composition containing the composition.

The preferred amount of nonionic group to be introduced into the NCO group-containing vinyl polymer (B) may be an amount which enables the hydrophobic polyisocyanate (A) to be easily dispersed in water and does not impair the stability of isocyanate groups in the dispersion obtained by dispersing the polyisocyanate composition of the present invention in water. The amount is preferably within a range from 8 to 80% by weight, more preferably from 12 to 65% by weight, and most preferably from 15 to 55% by weight, based on the weight of the NCO group-containing vinyl polymer (B).

Well-known isocyanate groups are incorporated into the NCO group-containing vinyl polymer (B). Typical examples thereof include an isocyanate group bonded to an alkyl group, an isocyanate group bonded to a cycloalkyl group, an isocyanate group bonded to an aryl group, an isocyanate group bonded to an alkyl group substituted with a cycloalkyl group, and an isocyanate group bonded to an alkyl group substituted with an aryl group.

The amount of preferred isocyanate group to be introduced into the NCO group-containing vinyl polymer (B) may be the amount, which enables the NCO group-containing vinyl polymer (B) to react with water or active hydrogens of the water-based resin (C) having the active hydrogen group-containing group, thereby to take part in crosslinking, and does not impair the stability of the water-dispersible polyisocyanate composition of the present invention. The amount is preferably within a range from 0.05 to 6 mol, more preferably from 0.1 to 5.0 mol, and most preferably from 0.2 to 4.0 mol, based on 1000 g of the NCO group-containing vinyl polymer (B).

In the water-dispersible polyisocyanate composition of the present invention, the NCO group-containing vinyl polymer (B) has an ability to disperse the hydrophobic polyisocyanate (A) in water. Therefore, the NCO group-containing vinyl polymer (B) has a function of imparting excellent dispersibility in water to the polyisocyanate composition of the present invention. The NCO group-containing vinyl polymer (B) imparts the stability against water to isocyanate groups contained in the water dispersion of the composition. Furthermore, since the NCO group-containing vinyl polymer (B) also has an isocyanate group, the water-based curable composition of the present invention comprising the polyisocyanate composition and water or a water-based resin (C) having an active hydrogen group-containing group described hereinafter or water and has excellent curability. Also, the water-based curable composition gives a cured material having excellent properties.

A hydrophobic group having 4 or more carbon atoms in total is preferably introduced into the NCO group-containing vinyl polymer (B) because the hydrophobic group can impart sperior despersibility in water to the polyisocyanate composition of the present invention and also improve the stability of isocyanate groups in the water dispersion of the composition to water.

Typical examples of the hydrophobic group having 4 or more carbon atoms in total to be introduced into the NCO group-containing vinyl polymer (B) include alkyl groups having 4 or more carbon atoms, such as n-butyl group, iso-butyl group, tert-butyl group, n-pentyl group, n-hexyl group, 2-ethylhexyl group, n-octyl group, n-dodecyl group, or n-octadecyl group; cycloalkyl groups having 4 or more carbon atoms, such as cyclobutyl group, cyclopentyl group, cyclohexyl group, cyclooctyl group, dicyclopentanyl group, bornyl group, or isobornyl group; alkyl groups substituted with a cycloalkyl group, such as cyclopentylmethyl group, cyclohexylmethyl group, 2-cyclopentylethyl group, or 2-cyclohexylethyl group; aryl groups or substituted aryl groups having 6 or more carbon atoms in total, such as phenyl group, 4-methyl phenyl group, or 1-naphthyl group; and aralkyl groups such as benzyl group or 2-phenylethyl group.

Among various hydrophobic groups having 4 or more carbon atoms in total described above, those having 4 to 22 carbon atoms in total are preferred and those having 5 to 18 carbon atoms in total are particularly preferred. Among hydrophobic groups, an alkyl group, a cycloalkyl group, or an alkyl group substituted with a cycloalkyl group is particularly preferred.

When introducing the hydrophobic group having 4 or more carbon atoms in total into the NCO group-containing vinyl polymer (B), the preferred amount of the hydrophobic group in the NCO group-containing vinyl polymer (B) is within a range from 1 to 45% by weight, and more preferably from 5 to 30% by weight.

The NCO group-containing vinyl polymer (B) has an isocyanate group in the molecule, but it is preferred to further introduce a reactive functional group such as blocked active hydrogen group-containing group, epoxy group, or hydrolyzable silyl group into the NCO group-containing vinyl polymer (B). Since these reactive functional groups take part in the crosslinking reaction, together with the isocyanate group, they can yield a cured material having excellent properties by improving the curability of the water-based curable composition of the present invention.

Typical examples of the blocked active hydrogen group-containing group include a blocked hydroxyl group, a blocked carboxyl group, and a blocked amino group. Among these blocked active hydrogen group-containing groups, typical examples of the blocked hydroxyl group include hydroxyl groups blocked with a triorganosilyl group, such as trimethylsilyl ether group, triethylsilyl ether group, dimethylcyclohexylsilyl ether group, or dimethyl tert-butylsilyl ether group; and hydroxyl groups blocked as acetal or ketal obtained by adding an α,β-unsaturated ether compound such as methyl vinyl ether, ethyl vinyl ether, 2-methoxypropene, dihydrofuran, or dihydropyrane to the hydroxyl group.

Typical examples of the blocked carboxyl group include carboxyl groups blocked as a triorganosilyl ester, such as trimethylsilyl ester group, triethylsilyl ester group, dimethylcyclohexylsilyl ester group, or dimethyl-tert-butyl silyl ester group; and carboxyl group blocked as a hemiacetal ester or hemiketal ester obtained by adding an α,β-unsaturated ether compound such as methyl vinyl ether, ethyl vinyl ether, 2-methoxypropene, dihydrofuran, or dihydropyrane to the carboxyl group.

Typical examples of the blocked amino group include amino groups blocked as a bis(triorganosilyl)amino group, such as bis(trimethylsilyl)amino group, bis(triethylsilyl) amino group, or bis(dimethyl-tert-butylsilyl)amino group; amino groups blocked as an aldimine obtained by reacting the amino group with an aldehyde compound such as formaldehyde, acetaldehyde, propionaldehyde, or n-butyraldehyde; amino groups blocked as a ketimine obtained by reacting the amino group with a ketone compound such as acetone, methyl ethyl ketone, or methyl isobutyl ketone; and amino groups blocked as an oxazolidine obtained by reacting 2-aminoalcohol with the aldehyde compound or ketone compound exemplified above as being used in the case of converting the amino group into aldimine or ketimine.

Among various blocked active hydrogen group-containing groups described above, a hydroxyl group blocked with a triorganosilyl group is particularly preferred. Since the hydroxyl group blocked with a triorganosilyl group has a hydrophobic property, introducing the hydrophobic group into the NCO group-containing vinyl polymer (B) can impart much better dispersibility in water to the polyisocyanate composition of the present invention and further enhance the stability of isocyanate groups contained in the water dispersion of the polyisocyanate composition.

Typical examples of the epoxy group include glycidyl group, methyl glycidyl group, and epoxycyclohexyl group.

Among the functional groups described above, the hydrolyzable silyl group refers to a silyl group to which a hydrolyzable group capable of being eliminated upon of hydrolysis to form hydroxyl groups bonded to silicon atoms is attached. Examples of the hydrolyzable groups are an alkoxy group, a substituted alkoxy group, a phenoxy group, an iminooxy group, an alkenyloxy group, or a halogen atom. Among these silyl groups, an alkoxysilyl group, to which an alkoxy group or substituted alkoxy group is bonded as the hydrolyzable group, is particularly preferred. Typical examples of the alkoxysilyl group include trimethoxysilyl group, triethoxysilyl group, tri-n-propoxysilyl group, tri-n-butoxysilyl group, methyldimethoxysilyl group, ethyldimethoxysilyl group, dimethylmethoxysilyl group, and tris(2-methoxyethoxy)silyl group.

Among the reactive functional groups described above to be introduced into the NCO group-containing vinyl polymer (B), a blocked active hydrogen group-containing group and an epoxy group are particularly preferred.

When the functional group such as blocked active hydrogen group-containing group, epoxy group, or hydrolyzable silyl group is introduced into the NCO group-containing vinyl polymer (B), the amount of these functional groups is within a range from 0.05 to 2 mol, and preferably from 0.1 to 1 mol, based on 1,000 g of the NCO group-containing vinyl polymer (B) in view of the dispersibility of the polyisocyanate composition of the present invention in water and the curability of the water-based curable composition of the present invention.

The weight-average molecular weight of the NCO group-containing vinyl polymer (B) is preferably within a range from 5,000 to 200,000, and more preferably from 8,000 to 70,000, in view of dispersibility of the water-dispersible polyisocyanate composition of the present invention in water, the stability of isocyanate groups contained in the water dispersion of the composition to water, and curability of the water-based curable composition of the present invention.

To prepare the NCO group-containing vinyl polymer (B), there can be applied methods such as (1) a method of reacting a hydrophobic polyisocyanate with a previously prepared vinyl polymer having a nonionic group and an active hydrogen group-containing group capable of reacting with an isocyanate group [hereinafter referred to as the method (1)], and (2) a method of copolymerizing a vinyl monomer having an isocyanate group [hereinafter referred to as the method (2)].

The method (1) will be described below.

The method (1) is characterized by reacting a hydrophobic polyisocyanate with a vinyl polymer (b) having a nonionic group and an active hydrogen group-containing group capable of reacting with and an isocyanate group) [hereinafter referred to as an active hydrogen group-containing vinyl polymer (b)] at such a molar ratio that the amount of the isocyanate group is present in excess relative to the active hydrogen group-containing group.

In the method (1), the same polyisocyanate exemplified for the hydrophobic polyisocyanate (A) can be used as the hydrophobic polyisocyanate. The polyisocyanate having a hydrophilic group can be used in combination in the amount, which does not impair the stability of the water-dispersible polyisocyanate composition of the present invention.

In the method (1), when the hydrophobic polyisocyanate is reacted with the active hydrogen group-containing vinyl polymer (b) so that a molar ratio of the isocyanate group to the active hydrogen group-containing group becomes about 1.5 to 3, the reaction mixture contains the NCO group-containing vinyl polymer (B) as the major component and the unreacted hydrophobic polyisocyanate as the minor component. The water-dispersible polyisocyanate composition of the present invention can be obtained by mixing the reaction mixture thus prepared with the hydrophobic polyisocyanate (A).

In the method (1), when the hydrophobic polyisocyanate is reacted with the active hydrogen group-containing vinyl polymer (b) so that a molar ratio of the isocyanate group to the active hydrogen group-containing group becomes about 3 to 350, a reaction mixture containing a larger amount of the unreacted hydrophobic polyisocyanate composition and the NCO group-containing vinyl polymer (B), that is, the water-dispersibile polyisocyanate of the present invention can be prepared in a single step. The method of producing the water-dispersible polyisocyanate composition of the present invention through the single-step reaction according to the present invention will now be described.

In the preparation of the water-dispersible polyisocyanate composition from the hydrophobic polyisocyanate and the active hydrogen group-containing vinyl polymer (b), both components must be reacted so that a molar ratio of the isocyanate group to the active hydrogen group-containing group is within a range from 3 to 350. The molar ratio is preferably within a range from 5 to 300, more preferably from 10 to 250, and most preferably from 15 to 100, in view of the dispersibility of the resulting polyisocyanate composition in water and the curability of the curable composition containing the composition.

To react the hydrophobic polyisocyanate with the active hydrogen group-containing vinyl polymer (b), there can be applied various methods, for example, ① a method of reacting both components after charging all of the components, ② a method of reacting under addition of a solution of the active hydrogen group-containing vinyl polymer (b) to the hydrophobic polyisocyanate and ③ a method of reacting under addition of the hydrophobic polyisocyanate to a solution of the active hydrogen group-containing vinyl polymer (b).

Among these methods, the methods ① and ② are preferred in view of inhibition of a gel formation. In the reaction of both components, a mixture of both components may be allowed to stand or stirred in an inert gas atmosphere at a relatively low temperature within a range from about 10 to 50° C., but is preferably stirred and heated at a temperature within a range from about 50 to 130° C. for 0.5 to 20 hours. In the reaction, well-known catalysts, which promote the reaction between the isocyanate group and the active hydrogen group-containing group, may be added.

The water-dispersible polyisocyanate composition of the present invention can be prepared by simultaneously conducting the preparation of the active hydrogen group-containing vinyl polymer (b) and the reaction between the active hydrogen group-containing vinyl polymer (b) and the polyisocyanate, if the hydrophobic polyisocyanate is used in place of a portion or all of the solvent in the preparation of the active hydrogen group-containing vinyl polymer (b).

A mixture obtained by further adding a hydrophobic polyisocyanate (A) to the water-dispersible polyisocyanate composition thus prepared can also be used as the water-dispersible polyisocyanate composition of the present invention.

The active hydrogen group-containing vinyl polymer (b) which is used to prepare the NCO group-containing vinyl polymer (B) or the water-dispersible polyisocyanate composition of the present invention by the method (1) will be described below.

Well-known active hydrogen group-containing groups capable of reacting with the isocyanate group are introduced into the active hydrogen group-containing vinyl polymer (b), and typical examples thereof include hydroxyl group, carboxyl group, phosphoric acid group, phosphorous acid group, sulfonic acid group, sulfinic acid group, mercapto group, silanol group, active methylene group, carbamate group, ureido group, carboxylic acid amide group, and sulfonic acid amide group. Among these groups, hydroxyl group, amino group, carboxyl group and active methylene group are preferred, and hydroxyl group and carboxyl group are particularly preferred, because of the ease of introduction. These various active hydrogen group-containing groups may be used alone, or two or more kinds thereof may be introduced.

To introduce the active hydrogen group-containing group into the vinyl polymer (b), well-known methods can be applied. It is simple and convenient to introduce by copolymerizing the vinyl monomer having the active hydrogen group-containing group.

Typical examples of the monomer having a hydroxyl group used in the preparation of the active hydrogen group-containing vinyl polymer (b) include (meth)acrylic acid esters having a hydroxy group, such as 2-hydroxyethyl(meth)acrylate, 2-hydroxypropyl(meth)acrylate, 3-hydroxypropyl(meth)acrylate, 2-hydroxybutyl(meth)acrylate, 4-hydroxybutyl(meth)acrylate, methyl(2-hydroxymethyl)acrylate, ethyl(2-hydroxymethyl)acrylate, butyl(2-hydroxymethyl)acrylate, (4-hydroxymethylcyclohexyl)methyl(meth)acrylate, glycerin mono(meth)acrylate, mono(2-hydroxypropyl)-mono[2-(meth)acryloyloxy]ethyl phthalate, and 2-hydroxy-3-phenoxypropyl(meth)acrylate; mono(meth)acrylates of polyoxyalkylene glycol having a hydroxyl group, such as polyethylene glycol mono(meth)acrylate, polypropylene glycol mono(meth)acrylate, and polybutylene glycol mono (meth)acrylate; allyl compounds having a hydroxyl group, such as allyl alcohol and 2-hydroxyethyl allyl ether; vinyl ether compounds having a hydroxyl group, such as 2-hydroxyethyl vinyl ether, 4-hydroxybutyl vinyl ether, and 6-hydroxyhexyl vinyl ether; unsaturated carboxylic acid amide compounds having a hydroxyl group, such as N-methylol (meth)acrylamide and N-methylol crotonic acid amide; hydroxyl group-containing unsaturated fatty acids such as ricinoleic acid; hydroxyl group-containing unsaturated fatty acid esters such as alkyl ricinoleate; and monomers obtained by carrying out the addition reaction between various hydroxyl group-containing monomers and ε-caprolactone. These monomers may be used alone, or two or more kinds thereof may be used in combination.

Typical examples of the monomer having a carboxyl group as the active hydrogen group-containing group include unsaturated carboxylic acids such as (meth)acrylic acid, 2-carboxyethyl acrylate, crotonic acid, vinylacetic acid, monovinyl adipate, monovinyl sebacate, monomethyl itaconate, monomethyl maleate, monomethyl fumarate, mono[2-(meth) acryloyloxyethyl] succinate, mono[2-(meth)acryloyloxyethyl] phthalate, mono[2-(meth)acryloyloxyethyl] hexahydrophthalate, and sorbic acid; and unsaturated dicarboxylic acids such as itaconic acid, maleic acid, and fumaric acid.

Typical examples of the monomer having an amino group as the active hydrogen group-containing group include secondary amino group-containing vinyl monomers such as 2-(N-methyl amino)ethyl(meth)acrylate, 2-(N-ethylamino) ethyl(meth)acrylate, 2-(N-n-butylamino)ethyl(meth)acrylate, 2-(N-tert-butylamino)ethyl methacrylate, 2-(N-methyl amino)ethyl crotonate, 2-(N-ethylamino)ethyl crotonate, and 2-(N-butylamino)ethyl crotonate. These monomers may be used alone, or two or more kinds thereof may be used in combination.

Typical examples of the monomer having an active methylene group as the active hydrogen group-containing group include vinyl acetoacetate, 2-acetoacetoxyethyl(meth)acrylate, 2-acetoacetoxypropyl(meth)acrylate, 3-acetoacetoxypropyl(meth)acrylate, 3-acetoacetoxybutyl(meth)acrylate, 4-acetoacetoxybutyl(meth)acrylate, allyl acetoacetate, and 2,3-di(acetoacetoxy)propyl methacrylate. These monomers may be used alone, or two or more kinds thereof may be used in combination.

The amount of the active hydrogen group-containing group to be introduced into the active hydrogen group-containing vinyl polymer (b) is preferably within a range from 0.01 to 5 mol, preferably from 0.05 to 3 mol, and most preferably from 0.1 to 2 mol, based on 1,000 g of the active hydrogen group-containing vinyl polymer (b) in view of the dispersibility of the polyisocyanate composition of the present invention in water and the stability of the isocyanate group in the water dispersion of the composition.

To introduce the nonionic group into the active hydrogen group-containing vinyl polymer (b), there can be applied methods, for example, ① a method of copolymerizing a vinyl monomer having a polyoxyalkylene group whose terminal is blocked with an alkoxy group and ② a method of reacting a previously prepared vinyl polymer having a functional group with a polyoxyalkylene compound which have a functional group reactive with the functional group in the vinyl polymer and a terminal blocked with an alkoxy group. Among these methods, the former method ① is preferred because it is simple and convenient.

Typical examples of the vinyl monomer having a polyoxyalkylene group used to prepare the active hydrogen group-containing vinyl polymer (b) by the method ① include various monomer such as (meth)acrylic acid ester, crotonic acid ester, itaconic acid ester, fumaric acid ester and vinyl ether monomers each having various polyoxyalkylene groups.

Typical examples of the (meth)acrylic acid ester monomer include esters of various monoalkoxylated polyether diols and (meth)acrylic acid, such as monomethoxylated polyethylene glycol, monomethoxylated polypropylene glycol, and monomethoxylated compound of polyether diol having both an oxyethylene unit and an oxypropylene unit.

The amount of the nonionic group to be introduced into the active hydrogen group-containing vinyl polymer (b) may be an amount which enables the polyisocyanate composition of the present invention obtained by reacting the active hydrogen group-containing vinyl polymer (b) with the hydrophobic polyisocyanate to be easily dispersed in water and does not impair the stability of isocyanate groups contained in the dispersion obtained by dispersing the polyisocyanate composition of the present invention in water. The amount is preferably within a range from 10 to 90% by weight, more preferably from 15 to 70% by weight, and most preferably from 20 to 60% by weight, based on the weight of the active hydrogen group-containing vinyl polymer (b).

The NCO group-containing vinyl polymer (B) having a hydrophobic group having 4 or more carbon atoms in total can be obtained by introducing a hydrophobic group having 4 or more carbon atoms in total into the active hydrogen group-containing vinyl polymer (b). As described above, it is made possible to impart superior dispersibility in water to the polyisocyanate composition of the present invention and further improve the stability of isocyanate groups in the water dispersion of the composition to water.

To introduce the hydrophobic group having 4 or more carbon atoms in total into the active hydrogen group-containing vinyl polymer (b), a vinyl monomer having such a group may be copolymerized.

Typical examples of the vinyl monomer having a hydrophobic group having 4 or more carbon atoms in total include (meth)acrylic acid esters which have an alkyl group having 4 to 22 carbon atoms in total, such as n-butyl(meth)acrylate, iso-butyl(meth)acrylate, tert-butyl(meth)acrylate, 2-ethylhexyl(meth)acrylate, lauryl(meth)acrylate, and octadecyl (meth)acrylate; various cycloalkyl(meth)acrylates such as cyclopentyl(meth)acrylate, cyclohexyl(meth)acrylate, bornyl(meth)acrylate, isobornyl(meth)acrylate, and dicyclopentanyl(meth)acrylate; cycloalkylalkyl(meth)acrylates such as cyclopentylmethyl(meth)acrylate, cyclohexylmethyl (meth)acrylate, and 2-cyclohexylethyl(meth)acrylate; various aralkyl(meth)acrylates such as benzyl(meth)acrylate and 2-phenylethyl(meth)acrylate; various aromatic vinyl monomers such as styrene, p-tert-butylstyrene, $\alpha$-methyl styrene, and vinyltoluene; vinyl esters of carboxylic acid having 5 or more carbon atoms in total, such as vinyl pivalate, vinyl versatate, and vinyl benzoate; various crotonic acid esters which have an alkyl group having 4 to 22 carbon atoms, such as crotonic acid-n-butyl and crotonic acid-2-ethylhexyl; various unsaturated dibasic acid diesters which have at least one alkyl group having 4 to 22 carbon atoms, such as di-n-butyl maleate, di-n-butyl fumarate, and di-n-butyl itaconate; various alkyl vinyl ethers which have an alkyl group having 4 to 22 carbon atoms, such as n-butyl vinyl ether and n-hexyl vinyl ether; and various cycloalkyl vinyl ethers such as cyclopentyl vinyl ether, cyclohexyl vinyl ether, and 4-methylcyclohexyl vinyl ether.

In the case in which a hydrophobic group having 4 or more carbon atoms in total is introduced into the active hydrogen group-containing vinyl polymer (b), the amount of the hydrophobic group is within a range from 1 to 50% by weight, and preferably from 5 to 30% by weight, based on the weight of the vinyl polymer (b) in view of the water dispersibility of the polyisocyanate composition of the present invention and the stability of the isocyanate group contained in the dispersion of the composition in water.

To introduce a blocked active hydrogen group-containing group, an epoxy group or a hydrolyzable silyl group into the active hydrogen group-containing vinyl polymer (b), well-known methods can be applied. It is simple and convenient to copolymerize a vinyl monomer having a functional group described above.

When these functional groups are introduced into the active hydrogen group-containing vinyl polymer (b), since these functional groups take part in the crosslinking reaction, together with the isocyanate group, the curability of the water-based curable composition of the present invention can be improved.

Typical examples of the vinyl monomer having a hydroxyl group blocked with a triorganosilyl group include 2-trimethylsiloxyethyl(meth)acrylate, 2-trimethylsiloxypropyl(meth)acrylate, 4-trimethylsiloxybutyl(meth)acrylate, 2-triethylsiloxyethyl(meth)acrylate, 2-tributylsiloxypropyl(meth)acrylate, 3-triphenylsiloxypropyl(meth)acrylate, 2-trimethylsiloxyethyl vinyl ether, and 4-trimethylsiloxybutyl vinyl ether.

Typical examples of the vinyl monomer having a silyl ester group include trimethylsilyl(meth)acrylate, dimethyl-tert-butylsilyl(meth)acrylate, dimethylcyclohexylsilyl(meth)acrylate, trimethylsilyl crotonate, and monovinyl-monotrimethylsilyl ester of adipic acid.

Typical examples of the vinyl monomer having a hemiacetal ester group or a hemiketal ester group include 1-methoxyethyl(meth)acrylate, 1-ethoxyethyl(meth)acrylate, 2-methoxy-2-(meth)acryloyloxypropane, and 2-(meth)acryloyloxytetrahydrofuran.

Typical examples of the vinyl monomer having an epoxy group include glicidyl(meth)acrylate, methylglicidyl(meth) acrylate, 3,4-epoxycyclohexyl(meth)acrylate, glicidyl vinyl ether, and allyl glicidyl ether.

Typical examples of the vinyl monomer having a hydrolyzable silyl group include vinyltrimethoxysilane, vinyltriethoxysilane, vinylmethyldimethoxysilane, vinyltris(2-methoxyethoxy)silane, allyltrimethoxysilane, 2-trimethoxysilylethyl vinyl ether, 3-trimethoxysilylpropyl vinyl ether, 3-(methyldimethoxysilyl)propyl vinyl ether, 3-(meth)acryloyloxypropyltrimethoxysilane, 3-(meth)acryloyloxypropyltriethoxysilane, 3-(meth)acryloyloxypropylmethyldimethoxysilane, 3-(meth)acryloyloxypropyl-tri-n-propoxysilane, 3-(meth)acryloyloxypropyl-tri-isopropoxysilane, and 3-(meth)acryloyloxypropylmethyldichlorosilane.

In the case in which a blocked active hydrogen group-containing group, an epoxy group, or a hydrolyzable silyl group is introduced into the active hydrogen group-containing vinyl polymer (b), the amount of these functional groups is within a range from 0.05 to 2 mol, and preferably from 0.1 to 1 mol, based on 1,000 g of the active hydrogen group-containing vinyl polymer (b) in view of the dispersibility of the polyisocyanate composition of the present invention in water and the curability of the water-based curable composition of the present invention.

In the preparation of the active hydrogen group-containing vinyl polymer (b), in addition to various monomers described above, other well-known monomers copolymerizable with them can be used. Typical examples thereof include (meth) acrylic acid esters which have an alkyl group having 3 or less carbon atoms, such as methyl(meth)acrylate, ethyl(meth) acrylate, and n-propyl(meth)acrylate; various ω-alkoxyalkyl (meth)acrylates such as 2-methoxyethyl(meth)acrylate and 4-methoxybutyl(meth)acrylate; vinyl esters of carboxylic acid having 4 or less carbon atoms in total, such as vinyl acetate and vinyl propionate; various crotonic acid esters which have an alkyl group having 3 or less carbon atoms, such as methyl crotonate or ethyl crotonate; various unsaturated dibasic acid diesters which have an alkyl group having 3 or less carbon atoms, such as dimethyl maleate, dimethyl fumarate, and dimethyl itaconate; various cyano group-containing vinyl monomers such as (meth)acrylonitrile and crotononitrile; various fluoroolefins such as vinyl fluoride, vinylidene fluoride, tetrafluoroethylene, chlorotrifluoroethylene, and hexafluoropropylene; various chlorinated olefins, such as vinyl chloride and vinylidene chloride; various $\alpha$-olefins such as ethylene and propylene; various alkylvinyl ethers which have an alkyl group having 3 or less carbon atoms, such as ethyl vinyl ether and n-propyl vinyl ether; and tertiary amide group-containing vinyl monomers such as N,N-dimethyl (meth)acrylamide, N-(meth)acryloyl morpholine, N-(meth)acryloyl pyrrolidine and N-vinyl pyrrolidone.

In the preparation of the active hydrogen group-containing vinyl polymer (b), the polymerization method is not specifically limited and various well-known polymerization methods can be applied. Among these polymerization methods, a solution radical polymerization method in an organic solvent is preferred because it is simple and convenient.

In the case of applying the solution radical polymerization method, various well-known compounds can be used as the polymerization initiator. Typical examples thereof include various azo compounds such as 2,2'-azobis(isobutyronitrile), 2,2'-azobis(2,4-dimethylbutyronitrile), and 2,2'-azobis(2-methylbutyronitrile); and various peroxides such as tert-butylperoxy pivalate, tert-butylperoxy benzoate, tert-butylperoxy-2-ethyl hexanoate, di-tert-butyl peroxide, cumenehydroperoxide, and diisopropylperoxy carbonate.

As the organic solvent, any compound can be used as long as it is inert to the isocyanate group. Typical examples of the compound used as the solvent include aliphatic and alicyclic hydrocarbons, such as n-hexane, n-heptane, n-octane, cyclohexane, and cyclopentane; aromatic hydrocarbons such as toluene, xylene, and ethylbenzene; various esters such as ethyl acetate, n-butyl acetate, n-amyl acetate, and ethylene glycol monomethyl ether acetate; various ketones such as acetone, methyl ethyl ketone, methyl isobutyl ketone, methyl n-amyl ketone, and cyclohexanone; polyalkylene glycol dialkyl ethers such as diethylene glycol dimethyl ether, diethylene glycol diethyl ether, and diethylene glycol dibutyl ether; ethers such as 1,2-dimethoxyethane, tetrahydrofuran, and dioxane; and N-methyl pyrrolidone, dimethylformamide, dimethylacetamide, and ethylene carbonate. These compounds may be used alone, or two or more kinds thereof may be used in combination.

When various compounds described above are used as the solvent, using those with high water content, an adverse influence is exerted on the stability of the polyisocyanate composition of the present invention. Therefore, compounds having a water content as low as possible are preferably used. When a compound having a relatively high water content is used, the water content may be reduced by the azeotropic dehydration method in which a portion of the solvent is distilled off after the completion of the polymerization.

The weight-average molecular weight of the vinyl polymer (b) thus prepared is preferably within a range from 3,000 to 100,000, and more preferably from 5,000 to 40,000, in view of the dispersibility of the polyisocyanate composition of the present invention in water, the stability of the isocyanate group in the water dispersion of the composition to water, and the curability of the water-based curable composition of the present invention.

The method (2), that is, the method of preparing the NCO group-containing vinyl polymer (B) by copolymerizing the isocyanate group-containing vinyl monomer will now be described.

To prepare the NCO group-containing vinyl polymer (B) by the method (2), there can be applied methods, for example, ① a method of polymerizing monomers containing an isocyanate group-containing vinyl monomer and a vinyl monomer having a nonionic group as an essential component and ② a method of reacting a vinyl polymer having an isocyanate group, which is obtained by polymerizing vinyl monomers containing an isocyanate group-containing vinyl monomer as an essential component, with a polyoxyalkylene glycol whose one terminal is blocked with a group such as alkoxy group at such a molar ratio that the amount of the isocyanate group is present in excess relative to the hydroxyl group. Among these methods, the former method ① is preferred because it is simple and convenient.

Typical examples of the vinyl monomer having an isocyanate group used in the method (2) include 2-isocyanatopropene, 2-isocyanatoethyl vinyl ether, 2-isocyanatoethyl methacrylate, m-isopropenyl-$\alpha$,$\alpha$-dimethylbenzyl isocyanate and a reaction product of a polyisocyanate with a vinyl monomer having a hydroxyl group.

In the method (2), as the vinyl monomer having a nonionic group, various monomers exemplified as being used in the method (1) can be used.

In the preparation of the NCO group-containing vinyl polymer (B) by the method (2), in addition to the vinyl monomer having an isocyanate group and the vinyl monomer having a nonionic group, other monomers copolymerizable with these monomers can be used. Typical examples of the other copolymerizable monomer include various monomers exemplified as the copolymerizable vinyl monomer used in the method (1).

To introduce a hydrophobic group having 4 or more carbon atoms in total into the NCO group-containing vinyl polymer (B), the vinyl monomer having a hydrophobic group having 4 or more carbon atoms in total described in the method (1) may be copolymerized so that the amount of the hydrophobic group to be introduced is a preferable amount described above.

To introduce a functional group such as blocked active hydrogen group-containing group, epoxy group, or hydrolyzable silyl group, into the NCO group-containing vinyl polymer (B), the vinyl monomer described in the method (1) may be copolymerized so that the amount of the functional group to be introduced is a preferable amount described above.

To prepare the NCO group-containing vinyl polymer (B) by using various vinyl monomers described above, the solution radical polymerization may be conducted using the polymerization initiator and the organic solvent described as those used in the preparation of the active hydrogen group-containing vinyl polymer (b).

In the preparation of the NCO group-containing vinyl polymer (B), a mixture of the organic solvent and the hydrophobic polyisocyanate (A) or the hydrophobic polyisocyanate (A) can be used as the solvent by replacing a portion or all of the organic solvent by the hydrophobic polyisocyanate (A).

The water-dispersible polyisocyanate composition of the present invention can be obtained by mixing a mixture containing the NCO group-containing vinyl polymer (B) as the major component and the unreacted hydrophobic polyisocyanate as the minor component prepared by the method (1) with the hydrophobic polyisocyanate (A), or by mixing the NCO group-containing vinyl polymer (B) prepared by the method (2) with the hydrophobic polyisocyanate (A). When the NCO group-containing vinyl polymer (B) is mixed with the hydrophobic polyisocyanate (A), mixing conditions are not specifically limited, but both components may be generally mixed at a temperature from room temperature to 150° C., and preferably from room temperature to 100° C.

The ratio of the hydrophobic polyisocyanate (A) to the NCO group-containing vinyl polymer (B) in the water-dispersible polyisocyanate composition of the present invention is not specifically limited, but a weight ratio(A)/(B) is preferably within a range from 30/70 to 85/15, more preferably from 50/50 to 80/20, and most preferably from 60/40 to 80/20, in view of the dispersibility of the water-dispersible polyisocyanate composition of the present invention in water, the stability of the isocyanate group in the water dispersion of the composition to water, and the curability of the water-based curable composition of the present invention.

As described above, the water-dispersible polyisocyanate composition of the present invention is prepared by ① the method of mixing the previously prepared NCO group-containing vinyl polymer (B) with the hydrophobic polyisocyanate (A) or ② the method of reacting both components, the active hydrogen group-containing vinyl polymer (b) and the hydrophobic polyisocyanate, in a molar ratio of the isocyanate group to the active hydrogen group-containing group within a range from 3 to 350. Among these methods, the latter method ② is preferred because the stability of the isocyanate group is higher when the resulting water-dispersible polyisocyanate composition is dispersed in water.

The water-based curable composition containing the water-dispersible polyisocyanate composition of the present invention and the water-based resin (C) having an active hydrogen group-containing group will now be described.

The water-based resin (C) having an active hydrogen group-containing group used in the present invention may be any one which has an active hydrogen group-containing group capable of reacting with the isocyanate group, and its state and kind are not specifically limited. Typical examples of the active hydrogen group-containing group in the water-based resin (C) include a hydroxyl group, a carboxyl group, an amino group, an amide group, and groups having an active methylene group such as an acetoacetyl group. Among these groups, hydroxyl group and carboxyl group are particularly preferred. Examples of the state of the water-based resin (C) include well-known states, for example, an aqueous solution and a water dispersion such as colloidal dispersion emulsion.

Typical examples of the water-based resin (C) include vinyl polymers such as vinyl acetate resins, styrene-butadiene resins, styrene-acrylonitrile resins, acrylic resins, fluoroolefin resins, silicone-modified vinyl polymers, and polyvinyl alcohols; synthetic resins other than vinyl polymers, such as polyester resins, polyurethane resins, phenolic resins, melamine resins, epoxy resins, alkyd resins, polyamide resin, polyether resin, and silicone resins; and natural polymers such as animal protein, starch, cellulose derivative, dextrin, and gum arabic. Among these resins, vinyl polymers and various synthetic resins other than vinyl polymers are particularly preferred.

The amount of the active hydrogen group-containing group in the water-based resin (C) is within a range from 0.1 to 6 mol, preferably from 0.2 to 4 mol, and most preferably from 0.4 to 3 mol, based on 1,000 g of the solid component of the water-based resin in view of the curability of the water-based curable composition of the present invention and the water resistance of the resulting cured material. These water-based resins (C) may be used alone, or two or more kinds thereof may be used in combination.

Regarding the mixing ratio of the water-dispersible polyisocyanate composition of the present invention to the water-based resin (C), a ratio of (1) the number of moles of the isocyanate group in the polyisocyanate composition to (2) the total number of moles of the active hydrogen group-containing group in the water-based resin (C) and the blocked active hydrogen group-containing group in the NCO group-containing vinyl polymer (B), (1)/(2), is preferably within a range from 0.1 to 5, more preferably from 0.3 to 3, and most preferably from 0.5 to 2, in view of the curability of the curable composition and performances of the cured material obtained from the composition.

The water-based curable composition of the present invention can be used as a clear composition containing no pigments, or can be used as a colored composition after mixing various well-known organic or inorganic pigments.

The water-based curable composition thus prepared can be used for various applications such as coatings, adhesives, inks, waterproof materials, sealing agents, impregnants for various fibers (e.g. natural fibers, synthetic fibers, glass fibers, etc.) and papers; and surface treating agents for various fibers (e.g. natural fibers, synthetic fibers, glass fibers, etc.) and papers. It is particularly preferably used as water-based coatings and water-based adhesives.

When the curable composition is used as a water-based coating, such a water-based coating has a long pot life and, furthermore, gives or yields a cured coating film having excellent properties in appearance such as transparency or gloss, water resistance and solvent resistance.

When the curable composition is used as a water-based adhesive, such a water-based adhesive has excellent characteristics such as long pot life and high adhesive strength.

If necessary, such a composition can contain additives suitable for various applicaitons, for example, well-known additives such as fillers, leveling agents, thickeners, defoamers, organic solvents, ultraviolet absorbers, antioxidants, and pigment dispersants.

The water-based curable composition containing the water-dispersible polyisocyanate composition of the present invention and water will now be described.

The water-based curable composition of the present invention can be obtained by mixing the water-dispersible polyisocyanate composition with water. In order to obtain such a water-based curable composition, from the point of the stability of the isocyanate group and curability of the composition and performances of the cured material obtained from the composition 10 to 1,000 parts by weight of water, preferably 50 to 500 parts by weight of water may be added to 100 parts by weight of the polyisocyanate composition, followed by mixing.

The water-based curable composition obtained by mixing the water-dispersible polyisocyanate composition with water can be used as a clear composition containing no pigments, or can be used as a colored composition after mixing various well-known organic or inorganic pigments. If necessary, there can be used various additives described as those which can be added to the water-based curable composition obtained from the polyisocyanate composition and the water-based resin (C).

The water-based curable composition thus obtained can be used for the same applicaitons as in case of the water-based curable composition, and it is particularly preferably used as the water-based coating and the water-based adhesives.

The coating containing the water-based curable composition has a long pot life and penetrates into a high-density inorganic substrate, into which a conventional water-based coating hardly penetrates, to form a cured coating film. Since this coating film has a function of effectively protecting the substrate and also has good adhesion to a top coat coating, this coating can be used as a high-performance undercoat coating.

Also this water-based coating can be used as the top coat coating for various substrates, as well as as the undercoat coating.

When the curable composition is used as the water-based adhesive, the adhesive can be used as an adhesive for various purposes because it has a long pot life and can impart a high adhesive strength.

As the substrate to be coated with the water-based coating of the present invention and the substrate to be coated with the water-based adhesive of the present invention, well-known substrates are used. Typical examples thereof include various metal substrates, inorganic substrates, plastic substrates, papers, synthetic fibers, natural fibers, inorganic fibers such as glass fibers, cloths, synthetic leathers, natural leathers, and wood substrates.

Among various substrates, typical examples of the metal substrates include metals such as iron, nickel, aluminum, chromium, zinc, tin, copper, and lead; alloys of various metals described above, such as stainless steel and brass; and various surface-treated metals obtained by subjecting various metals and alloys described above to a plating or chemical treatment.

Examples of the inorganic substrate include hardened material made from calcium compounds such as calcium silicate, calcium aluminate, calcium sulfate, and calcium oxide; ceramics obtained by sintering metal oxides such as alumina, silica, and zirconia; tiles obtained by firing various clay minerals; and various glasses. Typical examples of the hardened material produced from calcium compounds include hardened material of cement composition, such as concrete or mortar, asbestos slate, autoclaved lightweight concrete (ALC) cured material, dolomite plaster hardened material, gypsum plaster hardened material, and calcium silicate plate.

Typical examples of the plastic substrate include molded material of thermoplastic resins such as polystyrene, polycarbonate, polymethyl methacrylate, ABS resin, polyphenylene oxide, polyurethane, polyethylene, polyvinyl chloride, polypropylene, polybutylene terephthalate, and polyethylene terephthalate; and molded materials of various thermosetting resins such as unsaturated polyester resin, phenolic resin, crosslinkable polyurethane, crosslinkable acrylic resin, and crosslinkable saturated polyester resin.

Various pre-coated substrates of those exemplified above can also be used. Furthermore, pre-coated substrates whose precoated parts are deteriorated can also be used.

Various substrates are used in various forms such as plate, sphere, film, sheet, large-sized structure, and assembly having a complicated configuration according to the purposes, and are not specifically limited.

A cured coating film having excellent appearance and water resistance can be obtained by applying the water-based coating described above of the present invention on the substrate described above using well-known coating methods such as brush coating, roller coating, spray coating, dip coating, flow coater coating and roll coater coating methods, and leaving stand at room temperature for 1 to 10 days, or heating at a temperature within a range from about 40 to 250° C. for about 30 seconds to 2 hours.

High adhesive strength can be obtained by applying the water-based coating described above of the present invention on the same or different kinds of substrates using well-known coating methods such as spatula coating, brush coating, spray coating and roll coating methods, and then, leaving stand at room temperature for 1 to 10 days, or heating at a temperature within a range from about 40 to 150° C. for about 5 seconds to 2 hours, and optionally applying pressure.

EXAMPLES

The present invention will be described in detail according to Reference Examples, Examples, and Comparative Examples; however, the present invention is not limited thereto. In EXAMPLES, parts and percentages are by weight unless otherwise specified.

The water-dispersible polyisocyanate composition will be described according to Examples and Comparative Examples, and first, polyisocyanates used in the Examples and Comparative Examples will be described.

Hydrophobic polyisocyanate (A-1)

"Burnock DN-980S" [manufactured by DAINIPPON INK & CHEMICALS Inc., isocyanate group content (hereinafter abbreviated to a NCO group content): 21%, average number of NCO functional groups: about 3.6, nonvolatile content 100%] as hexamethylene diisocyanate (hereinafter abbreviated to HDI) isocyanurate type polyisocyanate Hydrophobic polyisocyanate (A-2)

"Burnock DN-950" [obtained by removing a solvent from an ethyl acetate solution, manufactured by DAINIPPON INK & CHEMICALS Inc., NCO group content: 17%, average number of NCO functional groups: about 3.2, nonvolatile content 100%] as polyisocyanate of an adduct type of HDI and triol Hydrophobic polyisocyanate (A-3)

"Burnock D-750" [obtained by removing a solvent from an ethyl acetate solution, manufactured by DAINIPPON INK & CHEMICALS Inc., NCO group content: 17%, average number of NCO functional groups: about 3.4, nonvolatile content 100%] as polyisocyanate of an adduct type of tolylene diisocyanate and triol Reference Example 1

Preparation of Active Hydrogen Group-Containing Vinyl Polymer (b)

In a four-necked flask equipped with a stirrer, a thermometer, a condenser and a nitrogen introducing tube, 429 parts of diethylene glycol diethyl ether (hereinafter abbreviated to EDE) was charged and heated to 110° C. under a nitrogen gas flow, and then a mixed solution of 500 parts of methoxypolyethylene glycol methacrylate (having 9 oxyethylene units on average per molecule, hereinafter abbreviated to "MPEGMA-1"), 300 parts of methyl methacrylate (hereinafter abbreviated to MMA), 50 parts of 2-hydroxyethyl methacrylate (hereinafter abbreviated to 2-HEMA), 150 parts of cyclohexyl methacrylate (hereinafter abbreviated to CHMA), 45 parts of t-butylperoxy-2-ethyl hexanoate and 5 parts of t-butylperoxy benzoate was added dropwise over 5 hours. After the completion of the dropwise addition, the mixture was reacted at 110° C. for 9 hours to obtain an acrylic polymer having a nonvolatile content of 70% in the form of a solution. Hereinafter, this is abbreviated to an active hydrogen group-containing vinyl polymer (b-1).

Reference Examples 2 to 6

Preparation of Active Hydrogen Group-Containing Vinyl Polymer (b)

In the same manner as in Reference Example 1, except that monomers shown in Table 1 were used in place of 500 parts of MPEGMA-1, 300 parts of MMA, 150 parts of CHMA and 50 parts of 2-HEMA, the mixture was polymerized to obtain acrylic polymers having a nonvolatile content of 70%. These polymers are abbreviated to active hydrogen group-containing vinyl polymers (b-2) to (b-6), respectively. The mixing ratios for Reference Examples 1 to 6 are shown in Table 1.

groups in the resulting water dispersion were evaluated. These evaluation results are shown in Table 2-1.

TABLE 1

|  | Reference Example 1 | Reference Example 2 | Reference Example 3 | Reference Example 4 | Reference Example 5 | Reference Example 6 |
|---|---|---|---|---|---|---|
| Vinyl polymer | b-1 | b-2 | b-3 | b-4 | b-5 | b-6 |
| EDE | 429 | 429 | 429 | 429 | 429 | 429 |
| MPEGMA-2 | — | — | — | — | 200 | — |
| MPEGMA-1 | 500 | 500 | 500 | 500 | 200 | 500 |
| MPEGMA-3 | — | — | — | — | 200 | — |
| 2-HEMA | 50 | 50 | 50 | — | — | 70 |
| MAA | — | — | — | — | 50 | — |
| 4HCHMA | — | — | — | 50 | — | — |
| SiHEMA | — | 150 | — | — | — | — |
| GMA | — | — | 100 | — | — | — |
| 2-EHMA | — | — | — | 50 | 150 | — |
| CHMA | 150 | — | 150 | 150 | — | — |
| MMA | 300 | 300 | 200 | 250 | 200 | 430 |
| Nonvolatile content (%) | 70 | 70 | 70 | 70 | 70 | 70 |
| Weight-average molecular weight ($\times 10^4$) | 1.7 | 1.5 | 1.6 | 1.8 | 1.4 | 1.5 |

[Notes of Table 1]
Units of all numerical values, which indicate the amount of raw materials, are parts.
"MPEGMA-2": [methoxypolyethylene glycol methacrylate (having 4 oxyethylene units on average per molecule)]
"MPEGMA-3": [methoxypolyethylene glycol methacrylate (having 23 oxyethylene units on average per molecule)]
"MAA": methacrylic acid
"SiHEMA": 2-trimethylsiloxyethyl methacrylate
"GMA": glicidyl methacrylate
"2-EHMA": 2-ethylhexyl methacrylate
"4HCHMA": (4-hydroxymethylcyclohexyl)methyl methacrylate Reference Example 7

Preparation of Comparative Dispersant (Z-1) Used in Comparative Example

In the same reaction vessel as in Reference Example 1, 239 parts of methoxypolyethylene glycol (having 12 oxyethylene units on average per molecule, hereinafter abbreviated to "MPEG-1" and 112 parts of hexadecanol were charged, and after sufficiently mixing at room temperature under a nitrogen gas flow, 180 parts of the hydrophobic polyisocyanate (A-1) was added, followed by stirring at room temperature for 30 minutes. After heating to 70° C., the reaction was conducted at the same temperature for 6 hours until isocyanate groups disappeared. The resulting product is abbreviated to a comparative dispersant (Z-1).

Example 1

Preparation of Water-Dispersible Polyisocyanate Composition (P-1)

In the same reaction vessel as in Reference Example 1, 200 parts of the hydrophobic polyisocyanate (A-1) and 100 parts of the active hydrogen group-containing vinyl polymer (b-1) were charged and heated to 90° C. under a nitrogen gas flow, and then the mixture was reacted at the same temperature under stirring for 6 hours to obtain a water-dispersible polyisocyanate composition having a nonvolatile content of 90% and an NCO group content of 13%. Hereinafter, this composition is abbreviated to a polyisocyanate composition (P-1).

With respect to the resulting polyisocyanate composition, the dispersibility in water and the stability of isocyanate Examples 2 to 8

Preparation of Water-Dispersible Polyisocyanate Composition

Using the hydrophobic polyisocyanate (A) and the active hydrogen group-containing vinyl polymer (b) described in Table 2-1 in the amount described in the same table in place of 200 parts of the hydrophobic polyisocyanate (A-1) and 100 parts of the vinyl polymer (b-1), the reaction was conducted in the same manner as in Example 1 to prepare polyisocyanate compositions. Hereinafter, these compositions are abbreviated to polyisocyanate compositions (P-2) to (P-8). With respect to the resulting polyisocyanate compositions, the dispersibility in water and the stability of isocyanate groups in the resulting water dispersion were evaluated. These evaluation results are shown in Table 2-1.

Comparative Example 1

Preparation of Polyisocyanate Composition (RP-1) for Comparative Example

In the same reaction vessel as in Reference Example 1, 15 parts of EDE, 36 parts of MPEG-1 and 100 parts of the hydrophobic polyisocyanate (A-1) were charged and heated to 90° C. over 30 minutes, and then the mixture was reacted at 90° C. for 6 hours to obtain a non-hydrophobic polyisocyanate, which is modified with methoxypolyethylene glycol and has a nonvolatile content of 90%, an NCO group content of 12%. Hereinafter, this polyisocyanate is abbreviated to a polyisocyanate composition (RP-1). With respect to the resulting polyisocyanate composition, the dispersibility in water and the stability of isocyanate groups in the resulting water dispersion were evaluated in the same manner as in Example 1. These evaluation results are shown in Table 2-2.

Comparative Example 2

Preparation of Polyisocyanate Composition for Comparative Example

In the same reaction vessel as in Reference Example 1, 33 parts of EDE, 200 parts of the hydrophobic polyisocyanate (A-1) and 100 parts of the comparative dispersant (Z-1) were charged and heated to 50° C., followed by mixing with stirring under a nitrogen gas flow for 3 hours to obtain a comparative polyisocyanate composition having a nonvolatile content of 90% and an NCO group content of 12.6%. Hereinafter, this composition is abbreviated to a polyisocyanate composition (RP-2). With respect to the resulting polyisocyanate composition, the dispersibility in water and the stability of isocyanate groups in the resulting water dispersion were evaluated in the same manner as in Example 1. These evaluation results are shown in Table 2-2.

Comparative Example 3

Preparation of Polyisocyanate Composition for Comparative Example

In the same reaction vessel as in Reference Example 1, 35 parts of the hydrophobic polyisocyanate (A-1), 15 parts of methoxypolyethylene glycol (having 22 oxyethylene units on average per molecule) and 67 parts of propylene glycol monomethyl ether acetate were charged and heated to 110° C., followed by mixing with stirring under a nitrogen gas flow for 3 hours. After adding 0.5 parts of p-toluenesulfonyl isocyanate and heating to 130° C., a mixture of 5 parts of styrene, 5 parts of MMA, 10 parts of n-butyl acrylate (hereinafter abbreviated to BA), 15 parts of 3-isopropenyl-α,α-dimethylbenzyl isocyanate, 15 parts of methoxypolyethylene glycol methacrylate (having 22 oxyethylene units on average per molecule), 0.25 parts of α-methylstyrene dimer and 1.5 parts of t-butylperoxyisopropyl carbonate was added dropwise over 3 hours. After the completion of the dropwise addition, the reaction was conducted at 130° C. for 3 hours to obtain a comparative polyisocyanate composition having a NCO group content of 6.0%. Hereinafter, this composition is abbreviated to a polyisocyanate composition (RP-3). With respect to the resulting polyisocyanate composition, the dispersibility in water and the stability of isocyanate groups in the resulting water dispersion were evaluated in the same manner as in Example 1. These evaluation results are shown in Table 2-2.

TABLE 2-1

|  | Example 1 | Example 2 | Example 3 | Example 4 | Example 5 | Example 6 | Example 7 | Example 8 |
|---|---|---|---|---|---|---|---|---|
| Polyisocyanate composition | P-1 | P-2 | P-3 | P-4 | P-5 | P-6 | P-7 | P-8 |
| Polyisocyanate | A-1 | A-1 | A-1 | A-1 | A-1 | A-1 | A-2 | A-3 |
| Vinyl polymer | b-1 | b-2 | b-3 | b-4 | b-5 | b-6 | b-1 | b-1 |
| Amount of polyisocyanate (A) [Parts] | 200 | 200 | 200 | 200 | 200 | 200 | 200 | 200 |
| Amount of active hydrogen group-containing vinyl polymer (b) [Parts] | 100 | 100 | 100 | 100 | 100 | 100 | 100 | 100 |
| Nonvolatile content [%] | 90 | 90 | 90 | 90 | 90 | 90 | 90 | 90 |
| NCO group content [%] | 13 | 13 | 13 | 13 | 13 | 13 | 11 | 11 |
| Dispersibility in water | ◎ | ◎ | ◎ | ◎ | ○ | ○ | ◎ | ○ |
| Residual isocyanate groups [%] | 92 | 90 | 95 | 90 | 88 | 85 | 93 | 70 |
| NCO/active hydrogen group-containing group [Molar ratio] | 37.1 | 37.1 | 37.1 | 56.0 | 24.5 | 26.5 | 30.1 | 30.1 |
| Weight ratio (A)/(B) | 2.0 | 2.0 | 2.0 | 2.3 | 1.7 | 1.8 | 2.0 | 1.9 |

TABLE 2-2

|  | Comparative Example 1 | Comparative Example 2 | Comparative Example 3 |
|---|---|---|---|
| Polyisocyanate composition | RP-1 | RP-2 | RP-3 |
| Polyisocyanate | A-1 | A-1 | A-1 |
| Comparative dispersant | — | Z-1 | — |
| Amount of polyisocyanate (A) [Parts] | 100 | 200 | 35 |
| Amount of comparative dispersant [Parts] | — | 100 | — |
| Amount of EDE [Parts] | 15 | 33 | — |
| Nonvolatile content [%] | 90 | 90 | 60 |
| NCO group content [%] | 12.0 | 12.6 | 6.0 |
| Dispersibility in water | Δ | Δ | ○ |
| Residual isocyanate groups [%] | 23 | 61 | 17 |

[Notes of Tables 2-1 and 2-2]
Units of all numerical values, which indicate the amount of raw materials, are parts by weight.
"Dispersibility in water":
In a 200 ml beaker, 80 g of deionized water was charged and 20 g of the polyisocyanate composition prepared was added, and then the mixture was maintained at 30° C. Using a magnetic stirrer and a rotator (full length: 30 mm, diameter: 8 mm), the mixture was stirred at a stirring rate of 200 rpm and its dispersing behavior was visually evaluated. Criteria for evaluation are as follows.
◎: uniformly dispersed after stirring of 30 seconds
○: uniformly dispersed after stirring of one minute
Δ: uniformly dispersed after stirring of 5 minutes
X: uniformly dispersed after stirring of 10 minutes
X X: not dispersed
"Residual isocyanate groups":
In the same manner as in case of the evaluation of the dispersibility in water, except that the stirring time was changed to 10 minutes, the dispersion was conducted to prepare a water dispersion of a polyisocyanate composition. An excess amount of dibutylamine was added to a specific amount of the resulting water dispersion and the isocyanate group content in the water dispersion was determined by a back titration method in which the residual dibutylamine in titrated with aqueous hydrochloric acid solution. The isocyanate group content was determined immediately after the preparation of the water dispersion and after 6 hours, and then the stability of the NCO group in the water dispersion is evaluated by the residual isocyanate groups (%) calculated by the equation described below. The larger this value, the better the stability of isocyanate groups.
Residual isocyanate groups [%] = (isocyanate group content after 6 hours/ isocyanate group content immediately after dispersion) × 100

TABLE 2-2-continued

| | Comparative Example 1 | Comparative Example 2 | Comparative Example 3 |
|---|---|---|---|

"NCO/active hydrogen group-containing group [molar ratio]": number of mols of NCO group/number of mols of active hydrogen group-containing group
"Weight ratio (A)/(B)": [weight of unreacted hydrophobic polyisocyanate (A)]/[weight of vinyl polymer (B) produced by the addition of hydrophobic polyisocyanate (A) to vinyl polymer (b)]

Reference Example 8

Preparation of Water-Based Resin (C-1)

In the same reaction vessel as in Reference Example 1, 5 parts of "HIGTENOL N-08" [anionic emulsifier, manufactured by DAI-ICHI KOGYO SEIYAKU CO,. LTD.], 5 parts of "Emulgen 931" [nonionic emulsifier, manufactured by Kao Corp.] and 270 parts of deionized water were charged and heated to 80° C. under a nitrogen gas flow, and then an aqueous solution prepared by dissolving 0.8 parts of ammonium persulfate in 16 parts of deionized water was charged. Furthermore, a mixed solution of 80 parts of butyl acrylate, 99 parts of methyl methacrylate, 4 parts of acrylic acid and 17 parts of 2-hydroxyethyl methacrylate was added dropwise over 3 hours. After the completion of the dropwise addition, the reaction was conducted for 2 hours and the resulting product was cooled to 25° C. and neutralized with 1.5 parts of 28% ammonia water. After mixing with 30 parts of EDE, a hydroxyl group-containing acrylic resin emulsion having a nonvolatile content of 40% and a solids hydroxyl value of 35 was obtained. Hereinafter, this resin is abbreviated to a water-based resin (C-1).

Example 9

50 Parts of the polyisocyanate composition (P-1) was mixed with 500 parts of a water-based resin (C-1) so that a molar ratio of the isocyanate group to the hydroxyl group in the water-based resin (C-1) becomes 1.2/1 to prepare a water-based curable composition. Hereinafter, this composition is abbreviated to a water-based curable composition (D-1). Immediately after preparation, the resulting water-based curable composition (D-1) was applied on a glass plate and a polypropylene plate (hereinafter abbreviated to a PP plate) using an applicator so that the resulting dried coating film has a thickness of 60 µm, followed by drying under the conditions of a temperature of 20° C. and a humidity of 60% RH for one week to form a cured coating film. With respect to the resulting cured coating film, the compatibility, gel fraction and water resistance were evaluated. The evaluation results are shown in Table 3.

Examples 10 to 17

In these Examples, as the water-based resin (C), "Watersol ACD-2000" [aqueous dispersion of acrylic resin having a hydroxyl group, manufactured by DAINIPPON INK & CHEMICALS Inc., nonvolatile content: 35%, solids hydroxyl value: 50 mg KOH/g, hereinafter this resin is abbreviated to a water-based resin (C-2)] was used, in addition to the water-based resin (C-1).

As shown in Table 3, various polyisocyanate compositions were used in place of the polyisocyanate composition (P-1). 500 parts of the water-based resin (C-1) or (C-2) was used and the amount described in the same table of the polyisocyanate composition was mixed so that a molar ratio of the isocyanate group in each polyisocyanate composition to the hydroxyl group in the water-based resin becomes 1.2/1 to prepare water-based curable compositions. Hereinafter, these compositions thus obtained are abbreviated to water-based curable compositions (D-2) to (D-9). Immediately after preparation, each of the water-based curable compositions thus obtained was applied on a glass plate and a PP plate in the same manner as in Example 9, followed by drying under the conditions of a temperature of 20° C. and a humidity of 60% RH for one week to form cured coating films. With respect to the resulting cured coating films, the same evaluation as in Example 9 was conducted. The evaluation results are shown in Table 3.

Comparative Examples 4 to 6

500 parts of the water-based resin (C-1) or (C-2) as the water-based resin (C) was used, and each polyisocyanate composition was mixed in the amount described in Table 3 so that a molar ratio of the isocyanate group in each polyisocyanate composition to the hydroxyl group in the water-based resin becomes 1.2/1 to prepare water-based curable compositions. Hereinafter, these compositions thus obtained are abbreviated to curable compositions (RD-1) to (RD-3) for comparative evaluation. Immediately after preparation, each of the water-based curable compositions thus obtained was applied on a glass plate and a PP plate, followed by drying to form cured coating films in the same manner as in Example 9. With respect to the resulting cured coating films, the same evaluation as in Example 9 was conducted. The evaluation results are shown in Table 3.

Examples 18 and 19 and Comparative Example 7

D-1, D-2 and RD-1 were allowed to stand at room temperature for 6 hours (referred to as D-1', D-2' and RD-1') and then each composition was applied on a glass plate using an applicator so that the resulting dried coating film had a thickness of 60 µm, followed by drying under the conditions of a temperature of 20° C. and a humidity of 60% RH for one week to form cured coating films. With respect to the resulting cured coating films, the same evaluation as in Example 9 was conducted. The evaluation results are shown in Table 3.

TABLE 3

| | Water-based curable composition | Polyisocyanate composition | Water-based resin | Amount of polyisocyanate composition [Parts] | Amount of water-based resin [Parts] |
|---|---|---|---|---|---|
| Example 9 | D-1 | P-1 | C-1 | 50 | 500 |
| Example 10 | D-2 | P-2 | C-1 | 50 | 500 |
| Example 11 | D-3 | P-3 | C-1 | 50 | 500 |
| Example 12 | D-4 | P-4 | C-1 | 50 | 500 |

TABLE 3-continued

| | | | | | |
|---|---|---|---|---|---|
| Example 13 | D-5 | P-5 | C-1 | 50 | 500 |
| Example 14 | D-6 | P-6 | C-1 | 50 | 500 |
| Example 15 | D-7 | P-7 | C-1 | 60 | 500 |
| Example 16 | D-8 | P-8 | C-1 | 60 | 500 |
| Example 17 | D-9 | P-1 | C-2 | 60 | 500 |
| Comparative Example 4 | RD-1 | RP-1 | C-1 | 55 | 500 |
| Comparative Example 5 | RD-2 | RP-2 | C-1 | 52 | 500 |
| Comparative Example 6 | RD-3 | RP-1 | C-2 | 65 | 500 |
| Example 18 | D-1' | P-1 | C-1 | 50 | 500 |
| Example 19 | D-2' | P-1 | C-1 | 50 | 500 |
| Comparative Example 7 | RD-1' | RP-1 | C-1 | 55 | 500 |

| | Compatibility | Gel fraction | Water resistance - Whitening of coating film | Water resistance - Blistering of coating film |
|---|---|---|---|---|
| Example 9 | ◎ | 94 | ○ | ○ |
| Example 10 | ◎ | 97 | ◎ | ◎ |
| Example 11 | ◎ | 97 | ◎ | ◎ |
| Example 12 | ◎ | 96 | ○ | ○ |
| Example 13 | ◎ | 92 | ○ | ○ |
| Example 14 | ○ | 90 | ○ | Δ |
| Example 15 | ◎ | 93 | ○ | ○ |
| Example 16 | ○ | 87 | ○ | Δ |
| Example 17 | ◎ | 92 | ○ | ○ |
| Comparative Example 4 | Δ | 83 | Δ | X |
| Comparative Example 5 | X | 77 | X | X |
| Comparative Example 6 | Δ | 82 | Δ | X |
| Example 18 | ◎ | 94 | ○ | ○ |
| Example 19 | ◎ | 98 | ◎ | ◎ |
| Comparative Example 7 | X | 80 | X | X |

[Notes of Table 3]
Units of all numerical values, which indicate the amount of raw materials, are parts by weight.
"Compatibility":
The transparency of a coating film formed on a glass plate was visually evaluated.
Criteria for evaluation are as follows.
◎: no turbidity
○: slight turbidity
Δ: considerable turbidity
X: severe turbidity
"Gel fraction":
The curability of a water-based curable composition was evaluated. A coating film formed on a PP plate was cut from the PP plate, dipped in acetone at 25° C. for 48 hours and then dried at 100° C. for 90 minutes. The gel fraction was calculated by the following equation.
Gel fraction [%] = (weight of coating film before dipping in acetone/weight of coating film after dipping in acetone) × 100
"Water resistance":
A coating film formed on a glass plate was dipped in deionized water at 25° C. for 96 hours and the appearance of the coating film was evaluated. Criteria for evaluation are as follows.
Criteria for evaluation of whitening of coating film
◎: no change
○: slight whitening
Δ: considerable whitening
X: severe whitening
Criteria for evaluation of blister of coating film
◎: no change
○: slight blistering
Δ: considerable blistering
X: severe blistering Reference Example 9

Preparation Example of Vinyl Polymer (b-7)

After sufficiently purging the air in a 2 liter stainless steel autoclave equipped with a thermometer, a stirrer and a monomer charging device with nitrogen gas, 430 g of EDE was charged and heated to 75° C. while stirring. While stirring at the same temperature, a mixture of 270 g of "Veova 9" (vinyl ester of $C_9$ branched fatty acid, manufactured by Shell Co., The Netherlands), 40 g of ethyl vinyl ether, 40 g of 4-hydroxybutyl vinyl ether, 400 g of a monovinyl ether of methoxypolyethylene glycol wherein a number-average molecular weight of a polyoxyethylene group is 400, 20 g of tert-butylperoxy pivalate, 15 g of tert-butylperoxy-2-ethyl hexanoate and 15 g of bis(1,2,2,6,6-pentamethylpiperidin-4- yl) sebacate, and 250 g of liquefied chlorotrifluoroethylene were charged over 7 hours. Furthermore, the polymerization reaction was conducted at the same temperature for 10 hours to obtain a solution of a nonionic group-containing fluoroolefin polymer having a nonvolatile content of 70% and a weight-average molecular weight of 16,000. Hereinafter, this polymer is abbreviated to an active hydrogen group-containing vinyl polymer (b-7).

Example 20

Preparation of Water-Dispersible Polyisocyanate Composition (P-9)

In the same reaction vessel as in Reference Example 1, 200 parts of the hydrophobic polyisocyanate (A-1) and 100 parts of the active hydrogen group-containing vinyl polymer (b-7) were charged and heated to 90° C. under a nitrogen gas flow, and then the reaction was conducted at the same temperature for 6 hours to obtain a water-dispersible polyisocyanate composition having a nonvolatile content of 90% and an NCO group content of 13%. Hereinafter, this composition is abbreviated to a polyisocyanate composition (P-9).

Reference Example 10

Preparation of Water-Based Resin (C4)

In a 2 liter stainless steel autoclave equipped with a thermometer, a stirrer and a monomer charging device, 690 g of deionized water, 15 g of sodium dodecylbenzene sulfonate, 6 g of polyoxyethylene nonyl phenyl ether (HLB17) and 3 g of ammonium hydrogencarbonate were charged and dissolved, followed by deaeration with nitrogen. A mixture of 116 g of hydroxybutyl vinyl ether, 184 g of vinyl acetate and 200 g of ethyl vinyl ether and 500 g of liquefied chlorotrifluoroethylene were respectively charged in a pressure-resistant dropping funnel.

After charging ethylene in the autoclave so that the pressure becomes 30 atmospheres, the autoclave was heated to 65° C. and a solution prepared by dissolving 5 g of ammonium persulfate in 90 g of deionized water and the monomer mixture charged in the pressure-resistant dropping funnel were added dropwise over 2 hours while stirring, and then the reaction was completed by maintaining the same temperature for additional 3 hours. The resulting product is a water-based resin (C-4) having a nonvolatile content of 55%, pH of 1.6 and a solids hydroxyl value of 50 mg KOH/g.

Examples 21 to 29

In these Examples, examples concerning a white coating comprising a polyisocyanate composition and a water-based resin (C) are described. In these Examples, as the water-based resin (C), the water-based resin (C-4) prepared in Reference Example 10 and the following water-based resin (C-3) were used. The method of preparing coating base component used to obtain a white coating from the polyisocyanate composition and the water-based resins (C-3) or (C-4) was described below.

Water-Based Resin (C-3)

"Voncoat CG-5060" (acrylic resin emulsion having a hydroxyl group, manufactured by DAINIPPON INK & CHEMICALS Inc., nonvolatile content: 45%, solids hydroxyl value: 60 mg KOH/g)

Preparation of Coating Base Component (Preparation of E-1)

A mixture of 72.9 parts of deionized water, 6.7 parts of "Orotan SG-1" (pigment dispersant, manufactured by Rohm and Haas Company, USA), 4.9 parts of an aqueous 10% solution of sodium tripolyphosphate, 2.2 parts of "Noigen EA-120" [wetting agent, manufactured by DAI-ICHI KOGYO SEIYAKU CO., LTD.], 18.0 parts of ethylene glycol, 1.0 parts of "Bestcide 1087T" [antiseptic, manufactured by DAINIPPON INK & CHEMICALS Inc.], 0.5 parts of ammonia water (28%), 249.2 parts of "Titanix JR-600A" [titanium oxide, manufactured by Tayca Co., Ltd.] and 0.8 parts of "SN Defoamer 121" [defoamer, manufactured by San Nopco Limited] was dispersed by a high speed mixer for about one hour. To the resulting dispersion, 607.0 parts of the water-based resin (C-3), 38.2 parts of "Texanol" [film forming agent, manufactured by Eastman Chemical Company, USA], 1.2 parts of an aqueous 10% solution of "Primal QR-708" [thickener, manufactured by Rohm and Haas Company, USA] and 0.2 parts of "BYK-028" [defoamer, manufactured by BYK Chemie Co.] were added, followed by stirring to obtain a coating base component (E-1) having a pigment weight concentration of 48% and a nonvolatile content of 52.5%.

Preparation of Coating Base Component (Preparation of E-2)

A mixture of 37.2 parts of deionized water, 0.7 parts of 25% ammonia water, 1.6 parts of "Noigen EA-120" [wetting agent, manufactured by DAI-ICHI KOGYO SEIYAKU CO., LTD.], 6.4 parts of "TAMOL 731" [pigment dispersant, manufactured by Rohm and Haas Company, USA], 35.4 parts of ethylene glycol, 194.7 parts of "TIPAQUE CR-97" [titanium dioxide, manufactured by Ishihara Sangyo Kaisha, Ltd.], 0.9 parts of "Bestcide FX" [antiseptic, manufactured by DAINIPPON INK & CHEMICALS Inc.], 1.4 parts of "Nopco 8034" [defoamer, manufactured by San Nopco Limited], 33.2 parts of an aqueous 5% solution of "Primal TT-935" [thickener, manufactured by Rohm and Haas Company, USA], 33.2 parts of diethylene glycol dibutyl ether and 655.3 parts of (C4) was uniformly dispersed by a high speed mixer for about one hour to obtain a coating base component (E-2) having a pigment weight concentration of 35% and a nonvolatile content of 56%.

Preparation of Water-Based Coatings (F-1) to (F-9)

The coating base components (E-1) or (E-2), each polyisocyanate composition and water were mixed at a mixing ratio described in Table 4 to prepare water-based coatings each having a nonvolatile content of 52%. In all examples, mixing was conducted so that a molar ratio of the isocyanate group to the hydroxyl group in the water-based resins (C-3, C-4) becomes 1.5/1. Hereinafter, white coatings thus prepared are abbreviated to water-based coatings (F-1) to (F-9).

Immediately after preparation, each of the water-based coatings (F-1) to (F-9) thus obtained was applied on a cement asbestos board by an air-spray method so that the resulting dried coating film has a thickness of 70 μm, followed by drying under the conditions of a temperature of 20° C. and a humidity of 60% RH for one week to form cured coating films. With respect to the resulting cured coating film, the gloss and water resistance were evaluated. The evaluation results are shown in Table 4.

Comparative Examples 8 and 9

The respective components shown in Table 4 were mixed at a mixing ratio described in the same table to prepare water-based coatings for comparison. Also in these Comparative Examples, mixing was conducted so that a molar ratio of the isocyanate group to the hydroxyl group in the water-based resin (C-3) becomes 1.5/1. Immediately after preparation, each of the water-based coatings (RF-1) and (RF-2) for comparison thus obtained was spray-coated on a cement asbestos board so that the resulting dried coating film has a thickness of 70 μm in the same manner as in Examples 21 to 29, followed by drying in the same manner as in the Examples to form cured coating films. With respect to the resulting cured coating film, the gloss and water resistance were evaluated. The evaluation results are shown in Table 4.

TABLE 4

| | Water-based coating | Polyisocyanate composition | Amount of polyisocyanate composition [Parts] | Coating base component |
|---|---|---|---|---|
| Example 21 | F-1 | P-1 | 75 | E-1 |
| Example 22 | F-2 | P-2 | 75 | E-1 |
| Example 23 | F-3 | P-3 | 75 | E-1 |
| Example 24 | F-4 | P-4 | 75 | E-1 |
| Example 25 | F-5 | P-5 | 75 | E-1 |
| Example 26 | F-6 | P-6 | 75 | E-1 |
| Example 27 | F-7 | P-7 | 90 | E-1 |
| Example 28 | F-8 | P-8 | 90 | E-1 |
| Example 29 | F-9 | P-9 | 80 | E-2 |
| Comparative Example 8 | RF-1 | RP-1 | 81 | E-1 |
| Comparative Example 9 | RF-2 | RP-2 | 77 | E-1 |

| | Amount of coating base component [Parts] | Gloss | Water resistance - Gloss retention [%] | Water resistance - Blistering of coating film |
|---|---|---|---|---|
| Example 21 | 500 | 86 | 84 | ○ |
| Example 22 | 500 | 91 | 90 | ◎ |
| Example 23 | 500 | 92 | 91 | ◎ |
| Example 24 | 500 | 86 | 87 | ○ |
| Example 25 | 500 | 84 | 83 | ○ |
| Example 26 | 500 | 83 | 80 | Δ |
| Example 27 | 500 | 84 | 83 | ○ |
| Example 28 | 500 | 81 | 80 | Δ |
| Example 29 | 500 | 81 | 93 | ◎ |
| Comparative Example 8 | 500 | 71 | 58 | X |
| Comparative Example 9 | 500 | 55 | 15 | X |

[Notes of Table 4]
Units of all numerical values, which indicate the amount of raw materials, are parts by weight.
"Gloss":
The appearance of a coating film is evaluated based on a gloss value as a 60 degree mirror reflectivity [%] of the coating film.

"Water resistance":
The gloss retention of a coating film after dipping a cement asbestos board coated with each of water-based coatings in deionized water at 25° C. for 96 hours and the state of blistering were evaluated. Blistering of the coating film was visually evaluated according to the same criteria as in Examples 9 to 19. The gloss retention was calculated by the following equation.
Gloss retention [%] = (gloss value after dipping in deionized water/gloss value before dipping in deionized water) × 100

Example 30

100 Parts of the water-dispersible polyisocyanate composition (P-1) and 100 parts of deionized water were mixed to prepare a water-based curable composition. Hereinafter, this composition is abbreviated to a water-based curable composition (G-1). Immediately after preparation, the resulting water-based curable composition (G-1) was applied on a glass plate and a PP plate using an applicator so that the resulting dried coating film has a thickness of 50 μm, followed by drying under the conditions of a temperature of 20° C. and a humidity of 60% RH for one week to form a cured coating film. With respect to the resulting cured coating film, the gel fraction and water resistance were evaluated by the same evaluation methods and evaluation criteria as in Examples 9 to 17. The evaluation results are shown in Table 5.

Examples 31 to 37 and Comparative Examples 10 and 11

In the same manner as in Example 30, except that 100 parts of various polyisocyanate compositions shown in Table 5 were used in place of 100 parts of the polyisocyanate composition (P-1), water-based curable compositions were prepared. Hereinafter, these compositions thus obtained are abbreviated to water-based curable compositions (G-2) to (G-8), (RG-1) and (RG-2). Immediately after preparation, each of the water-based curable compositions was applied on a glass plate and a PP plate in the same manner as in Example 30, followed by drying to form cured coating films. These cured coating films were evaluated in the same manner as in Example 30. The evaluation results are shown in Table 5.

TABLE 5

| | Water-based curable composition | Water-dispersible polyisocyanate composition | Gel fraction | Water resistance - Whitening of coating film | Water resistance - Blistering of coating film |
|---|---|---|---|---|---|
| Example 30 | G-1 | P-1 | 95 | ○ | ◎ |
| Example 31 | G-2 | P-2 | 97 | ◎ | ◎ |
| Example 32 | G-3 | P-3 | 98 | ◎ | ◎ |
| Example 33 | G-4 | P-4 | 96 | ○ | ◎ |
| Example 34 | G-5 | P-5 | 94 | ○ | ○ |
| Example 35 | G-6 | P-6 | 92 | ○ | ○ |
| Example 36 | G-7 | P-7 | 91 | ○ | ○ |
| Example 37 | G-8 | P-8 | 95 | ○ | ◎ |
| Comparative Example 10 | RG-1 | RP-1 | 80 | X | Δ |
| Comparative Example 11 | RG-2 | RP-2 | 86 | X | X |

Example 38

350 Parts of the water-dispersible polyisocyanate composition (P-1), 750 parts of deionized water and 0.2 parts of "BYK-028" (defoamer, manufactured by BYK Chemie Co.) were mixed to prepare a water-based coating. Hereinafter, this composition is abbreviated to a water-based coating (H-1). Immediately after preparation, the resulting water-based coating (H-1) was applied on a calcium silicate plate by an air-spray method so that the resulting dried coating film has a thickness of 30 µm to form a coating film. Then, the coating film was dried under the conditions of a temperature of 20° C. and a humidity of 60% RH for one week. With respect to the resulting cured coating film, the adhesion was evaluated.

Immediately after preparation, the water-based coating (H-1) was applied on a cement asbestos board by an air-spray method so that the resulting dried coating film had a thickness of 30 µm to form a coating film. The coating film was dried under the conditions of a temperature of 20° C. and a humidity of 60% RH for 24 hours. Immediately after preparation, the water-based coating (F-1) of Example 21 as a top coating was applied thereon by an air-spray method so that the resulting dried coating film had a thickness of 60 µm, followed by drying under the conditions of a temperature of 20° C. and a humidity of 60% RH for one week. With respect to the multi-layered cured coating film thus obtained, the adhesion was evaluated. The evaluation results are shown in Table 6.

Examples 39 to 45 and Comparative Examples 12 and 13

In the same manner as in Example 38, except that 350 parts of various polyisocyanate compositions shown in Table 6 were used in place of 350 parts of the polyisocyanate composition (P-1), water-based coatings were prepared. Hereinafter, these compositions are abbreviated to water-based coatings (H-2) to (H-8), (RH-1) and (RH-2). Each of these water-based coatings thus obtained was applied on various substrates in the same manner as in Example 38, followed by drying, application of the water-based coating (F-1) of Example 21 as the top coating and further drying to form cured coating films. These cured coating films were evaluated in the same manner as in Example 38. The evaluation results are shown in Table 6.

TABLE 6

|  | Water-based coating | Polyisocyanate composition | Adhesion (1) | Adhesion (2) |
| --- | --- | --- | --- | --- |
| Example 38 | H-1 | P-1 | 98 | 95 |
| Example 39 | H-2 | P-2 | 100 | 98 |
| Example 40 | H-3 | P-3 | 100 | 96 |
| Example 41 | H-4 | P-4 | 100 | 97 |
| Example 42 | H-5 | P-5 | 98 | 95 |
| Example 43 | H-6 | P-6 | 95 | 92 |
| Example 44 | H-7 | P-7 | 97 | 94 |
| Example 45 | H-8 | P-8 | 93 | 90 |
| Comparative Example 12 | RH-1 | RP-1 | 71 | 65 |
| Comparative Example 13 | RH-2 | RP-2 | 45 | 32 |

[Notes for Table 6]
"Adhesion (1)":
A crosscut pattern, consisting of 6 longitudinal cuts and 6 lateral cuts with 2 mm intervals, was made on the calcium silicate plate, and then a Scotch tape was tightly adhered and peeled off. The adhesion was evaluated by the retention of the coating film remained on the calcium silicate plate. The retention was calculated by the following equation.

TABLE 6-continued

|  | Water-based coating | Polyisocyanate composition | Adhesion (1) | Adhesion (2) |
| --- | --- | --- | --- | --- |

Retention [%] of coating film = (area of remaining coating film after peeling/area of coating film on cross-cuts before peeling) × 100
"Adhesion (2)":
With respect to the multi-layered coating film formed on the cement asbestos board, the same method as in case of adhesion (1) was applied and the adhesion was evaluated by a retention of the coating film remaining on the slate plate. Although, regarding a multi-layered coating film, there are two cases where only the top coating film is peeled off and peeling occurs from the undercoat coating film. In both cases, it was considered that the coating film was peeled off and did not remain, and the retention was calculated in the same manner as in case of "adhesion (1)".

Example 46

95 Parts of "HYDRAN HW-311" [aqueous dispersion of polyester-based urethane resin, manufactured by DAINIPPON INK & CHEMICALS Inc., nonvolatile content: 45%] and 5 parts of the water-dispersible polyisocyanate composition (P-1) were mixed and stirred to obtain a water-based adhesive (K-1). Immediately after preparation, the water-based adhesive (K-1) was sprayed on a 2 mm thick plywood (JAS type II) so that the amount of the adhesive became 80 g/m$^2$ and the coated plywood was then dried at 50° C. for 5 minutes. A 2 mm thick vinyl chloride sheet was laminated on the plywood, followed by hot pressing under the conditions of 50° C. and 0.01 MPa for one minute and further drying under the conditions of a temperature of 20° C. and a humidity of 60% RH for one week. With respect to the resulting composite of the plywood and the vinyl chloride sheet, the adhesion was evaluated at 60° C. The evaluation results are shown in the column of "Evaluation of adhesion (I)" in Table 7.

Examples 47 to 53 and Comparative Examples 14 and 15

In the same manner as in Example 46, except that 5 parts of various polyisocyanate compositions shown in Table 7 were used in place of 5 parts of the polyisocyanate composition (P-1), water-based adhesives (K-2) to (K-8), (RK-1) and (RK-2) were obtained. In the same manner as in Example 46, except that the respective adhesives thus obtained were used in place of the water-based adhesive (K-1), composites of the plywood and the vinyl chloride sheet were produced. The adhesions of these composites were evaluated at 60° C. The evaluation results are shown in the column of "Evaluation of adhesion (I)" in Table 7.

Change of Adhesion Over Time After Preparation of Adhesive

The water-based adhesives obtained in Examples 46 to 53 and Comparative Examples 14 and 15 were allowed to stand under the conditions of a temperature of 20° C. and a humidity of 60% RH for 3 hours. Using the respective adhesives, composites were produced in the same manner as in Example 46 and the adhesion was evaluated at 60° C. The evaluation results are shown in the column of "Evaluation of adhesion (II)" in Table 7. It was found that even when each adhesive prepared in Examples 46 to 53 was applied after 3 hours of preparation, the adhesive strength was only slightly reduced and thus the water-based adhesives of the present invention had a long pot life.

TABLE 7

|  | Water-based adhesive | Polyisocyanate composition | Evaluation of adhesion (I)(mm) | Evaluation of adhesion (II)(mm) |
|---|---|---|---|---|
| Example 46 | K-1 | P-1 | 0 | 2 |
| Example 47 | K-2 | P-2 | 0 | 1 |
| Example 48 | K-3 | P-3 | 0 | 1 |
| Example 49 | K-4 | P-4 | 0 | 2 |
| Example 50 | K-5 | P-5 | 0 | 3 |
| Example 51 | K-6 | P-6 | 0 | 5 |
| Example 52 | K-7 | P-7 | 0 | 3 |
| Example 53 | K-8 | P-8 | 0 | 3 |
| Comparative Example 14 | RK-1 | RP-1 | 0 | 34 |
| Comparative Example 15 | RK-2 | RP-2 | 0 | 25 |

[Notes for Table 7]
"Evaluation of adhesions (I) and (II):
Each of the composites of the plywood and the vinyl chloride sheet was cut into test pieces of 25 mm in width. Each test piece was fixed in a oven controlled at 60° C. and a load of 500 g was applied on the vinyl chloride sheet. After leaving stand for 15 minutes, 180 degree peel length (mm) was measured. The smaller this value, the better the adhesion.

Reference Example 11

Preparation of NCO Group-Containing Vinyl Polymer (B)

In the same vessel as in Reference Example 1, 429 parts of EDE was charged and heated to 110° C. under a nitrogen gas flow, and then a mixed solution of 400 parts of MPEGMA-1, 100 parts of 2-isocyanatoethyl methacrylate (hereinafter abbreviated to IEMA), 500 parts of MMA, 45 parts of t-butylperoxy-2-ethyl hexanoate and 5 parts of t-butylperoxy benzoate was added dropwise over 5 hours. After the completion of the dropwise addition, the reaction was conducted at 110° C. for 9 hours to obtain a solution of a vinyl polymer having a nonvolatile content of 70% and a weight-average molecular weight of 18,000. Hereinafter, this is abbreviated to a vinyl polymer (B-1). The raw material composition for the vinyl polymer (B-1) is shown in Table 8.

TABLE 8

|  | Reference Example 11 |
|---|---|
| Vinyl polymer | B-1 |
| EDE | 429 |
| MPEGMA-1 | 400 |
| IEMA | 100 |
| MMA | 500 |
| Nonvolatile content (%) | 70 |
| Weight-average molecular weight (×10$^4$) | 1.8 |

Example 54

Preparation of Water-Dispersible Polyisocyanate Composition (P-10)

In the same vessel as in Reference Example 1, 200 parts of the hydrophobic polyisocyanate (A-1) and 100 parts of the NCO group-containing vinyl polymer (B-1) were charged and heated to 50° C. under a nitrogen gas flow, followed by mixing with stirring at the same temperature for one hour to obtain a water-dispersible polyisocyanate composition having a nonvolatile content of 90% and an NCO group content of 14.6%. Hereinafter, this composition is abbreviated to a polyisocyanate composition (P-10).

The resulting polyisocyanate composition was evaluated by the same evaluation method as in Example 1-8 (Table 2-1), except for the isocyanate group retention in water. With respect to the isocyanate group retention, the value was determined after 3 hours have passed since the preparation of the water dispersion of the composition in the same manner as in Examples 1 to 8. The evaluation results are shown in Table 9.

TABLE 9

|  | Example 54 |
|---|---|
| Polyisocyanate composition | P-10 |
| Polyisocyanate | A-1 |
| Vinyl polymer | B-1 |
| Amount of polyisocyanate (A) [Parts] | 200 |
| Amount of vinyl polymer (B) [Parts] | 100 |
| Nonvolatile content [%] | 90 |
| NCO group content [%] | 14.6 |
| Dispersibility in water | ○ |
| Residual isocyanate groups [%] | 80 |

Example 55

43 Parts of the polyisocyanate composition (P-10) and 500 parts of the water-based resin (C-1) were mixed so that a molar ratio of the isocyanate group to the hydroxyl group in the water-based resin (C-1) becomes 1.2/1 to prepare a water-based curable composition. Hereinafter, this composition is abbreviated to a water-based curable composition (D-10). Immediately after preparation, the resulting water-based curable composition (D-10) was applied on a glass plate and a PP plate using an applicator so that the resulting dried coating film has a thickness of 60 μm, followed by drying under the conditions of a temperature of 20° C. and a humidity of 60% RH for one week to form a cured coating film.

The resulting cured coating film was evaluated by the same evaluation method and evaluation criteria as in Examples 9 to 19 (Table 3), except for evaluation of the gel fraction and water resistance. The evaluation results are shown in Table 10.

TABLE 10

|  | Example 55 |
|---|---|
| Water-based curable composition | D-10 |
| Polyisocyanate composition | P-10 |
| Water-based resin | C-1 |
| Amount of polyisocyanate composition [Parts] | 43 |
| Amount of water-based resin [Parts] | 500 |
| Compatibility | ○ |
| Gel fraction | 96 |
| Water resistance - Whitening of coating film | ◎ |
| Water resistance - Blistering of coating film | ○ |

[Notes for Table 10]
"Gel fraction":
The value was determined in the same manner as that described in notes of Table 3, except that the time of dipping the coating film in acetone was changed to 24 hours.
"Water resistance":
A coating film formed on a glass plate was dipped in deionized water at 25° C. for 48 hours and the appearance of the coating film was evaluated according to evaluation criteria shown in notes of Table 3.

Example 56

In this Example, examples with respect to a white coating comprising a polyisocyanate composition and the water-based resin (C-1) are described.

Preparation of Water-Based Coating

The coating base component (E-1), a polyisocyanate composition and water were mixed at a mixing ratio described in Table 11 to prepare each water-based coating having a nonvolatile content of 52%. In all examples, mixing was conducted so that a molar ratio of the isocyanate group to the hydroxyl group in the water-based resin (C-1) becomes 1.5/1. Hereinafter, a white coating thus prepared is abbreviated to water-based coating (F-10).

Immediately after preparation, the water-based coating (F-10) thus obtained was applied on a cement asbestos board by an air-spray method so that the resulting dried coating film has a thickness of 70 μm, followed by drying under the conditions of a temperature of 20° C. and a humidity of 60% RH for one week to form cured coating films. Each resulting cured coating film was evaluated by the same evaluation method and evaluation criteria as in Examples 21 to 29 (Table 4), except for evaluation of the water resistance. The evaluation results are shown in Table 11.

TABLE 11

|  | Example 56 |
| --- | --- |
| Water-based coating | F-10 |
| Polyisocyanate composition | P-10 |
| Amount of polyisocyanate composition [Parts] | 62 |
| Coating base component | E-1 |
| Amount of coating base component [Parts] | 500 |
| Gloss | 80 |
| Water resistance - Gloss retention [%] | 88 |
| Water resistance - Blistering of coating film | ○ |

[Notes of Table 11]
"Water resistance":
After dipping a cement asbestos board coated with the water-based coating (F-10) in deionized water at 25° C. for 48 hours, the state of blistering and the gloss retention of the coating film were evaluated. Blistering of the coating film was evaluated according to evaluation criteria shown in notes of Table 3. The gloss retention was calculated by the equation described in notes of Table 4.

Example 57

100 Parts of the water-dispersible polyisocyanate composition (P-10) and 100 parts of deionized water were mixed to prepare a water-based curable composition. Hereinafter, this composition is abbreviated to water-based curable composition (G-9). Immediately after preparation, the water-based curable composition (G-9) thus obtained was applied on a glass plate and a PP plate using an applicator so that the resulting dried coating film has a thickness of 50 μm, followed by drying under the conditions of a temperature of 20° C. and a humidity of 60% RH for one week to form a cured coating film. With respect to the resulting cured coating film, the gel fraction and water resistance were evaluated by the same evaluation method and evaluation criteria as in Example 55 (Table 10). The evaluation results are shown in Table 12.

TABLE 12

|  | Example 57 |
| --- | --- |
| Water-based curable composition | G-9 |
| Water-dispersible polyisocyanate composition | P-10 |
| Gel fraction | 96 |
| Water resistance - Whitening of coating film | ◎ |
| Water resistance - Blistering of coating film | ○ |

Example 58

350 Parts of the water-dispersible polyisocyanate composition (P-10), 750 parts of deionized water and 0.2 parts of "BYK-028" (defoamer, manufactured by BYK Chemie Co.) were mixed to prepare a water-based coating. Hereinafter, this composition is abbreviated to a water-based coating (H-9). Immediately after preparation, the water-based coating (H-9) was applied on a calcium silicate plate by an air-spray method so that the resulting dried coating film has a thickness of 30 μm to form a coating film. The coating film was dried under the conditions of a temperature of 20° C. and a humidity of 60% RH for one week.

With respect to the resulting cured coating film, the adhesion was evaluated. Immediately after preparation, the water-based coating (H-9) was applied on a cement asbestos board by an air-spray method so that the resulting dried coating film has a thickness of 30 μm to form a coating film, followed by drying under the conditions of a temperature of 20° C. and a humidity of 60% RH for 24 hours. Immediately after preparation, the water-based coating (F-1) of Example 21 as a top coating was applied thereon by an air-spray method so that the resulting dried coating film has a thickness of 60 μm, followed by drying under the conditions of a temperature of 20° C. and a humidity of 60% RH for one week. The multilayered cured coating film thus obtained was evaluated by the same evaluation method and evaluation criteria as in Examples 38 to 45 (Table 6). The evaluation results are shown in Table 13.

TABLE 13

|  | Example 58 |
| --- | --- |
| Water-based coating | H-9 |
| Polyisocyanate composition | P-10 |
| Adhesion (1) | 96 |
| Adhesion (2) | 95 |

INDUSTRIAL APPLICABILITY

The water-dispersible polyisocyanate composition of the present invention is useful for applications such as coatings, adhesives, and fiber processing agents because it is superior in dispersibility in water, stability to water, and compatibility with a water-based resin having an active hydrogen group-containing group. Also the water-based curable composition of the present invention is particularly useful as a water-based coating and a water-based adhesive because it is superior in dispersibility in water, stability to water and curability and gives a cured material which is superior in appearance and water resistance.

The invention claimed is:

1. A water-dispersible polyisocyanate composition comprising:
   a hydrophobic polyisocyanate (A); and
   a vinyl polymer (B) having an isocyanate group and a nonionic polyoxyalkylene group whose terinal is blocked,
   wherein a contant of the nonionic polyoxyalkylene group contained in the vinyl polymer (B) is 12 to 65% by weight.

2. A water-dispersible polyisocyanate composition according to claim 1, wherein the vinyl polymer (B) has a hydrophobic group having 4 or more carbon atoms in total.

3. A water-dispersible polyisocyanate composition according to claim 1, wherein the nonionic polyoxyalkylene group whose terminal is blocked is a polyoxyalkylene group whose terminal is blocked with an alkoxy group, a substituted alkoxy group, an ester group, or a carbamate group.

4. A water-dispersible polyisocyanate composition according to claim 1, wherein the vinyl polymer (B) is a polymer obtained by reacting a hydrophobic polyisocyanate with a vinyl polymer having a nonionic polyoxyalkylene roup whose terminal is blocked and an active hydrogen group-containing group capable of reacting with an isocyanate group.

5. A water-dispersible polyisocyanate composition according to claim 1, wherein the vinyl polyber (B) has a blocked active hydrogen group-containing group and/or an epoxy group.

6. A water-dispersible polyisocyanate composition according to claim 1, wherein the blocked active hydrogen group-containing group is a hydroxyl group blocked with a triorganosilyl group.

7. A water-dispersible polyisocyanate composition according to claim 1, wherein a ratio of the hydrophobic polyisocyanate (A) to the vinyl polymer (B) is within a range from 30:70 to 85:15 by weight.

8. A water-based curable composition comprising:
a water-dispersible polyisocyanate composition of any one of claims 1 to 7; and
a water-based resin (C) having an active hydrogen group-containing group capable of reacting with an isocyanate group.

9. A water-based curable coating comprising:
a water-based curable composition of claim 8.

10. A water-based adhesive comprising:
a water-based curable composition of claim 8.

11. A water-based curable composition comprising:
a water-dispersible polyisocyanate composition of any one of claims 1 to 7; and
water.

12. A water-based coating comprising:
a water-based curable composition of claim 11.

13. A water-based adhesive comprising:
a water-based curable compositon of claim 11.

* * * * *